United States Patent [19]

Noji et al.

[11] Patent Number: 5,646,466

[45] Date of Patent: Jul. 8, 1997

[54] ACTUATING APPARATUS AND ACTUATOR

[75] Inventors: Takayoshi Noji, Omiya; Sadayoshi Narusawa, Asahina-mura, both of Japan

[73] Assignees: Tamron Co., Ltd., Tokyo; Nihon Mini Motor Co., Ltd., Saku, both of Japan

[21] Appl. No.: 272,212

[22] Filed: Jul. 8, 1994

[30] Foreign Application Priority Data

Jul. 9, 1993 [JP] Japan .................. 5-169958
Dec. 13, 1993 [JP] Japan .................. 5-311860

[51] Int. Cl.⁶ .................. H02K 7/20; H02K 23/60
[52] U.S. Cl. .................. 310/112; 310/118
[58] Field of Search .................. 310/112, 111, 310/118, 68 B, 114; 318/71, 69

[56] References Cited

U.S. PATENT DOCUMENTS

| | | | |
|---|---|---|---|
| 4,240,020 | 12/1980 | Okuyama et al. | 318/721 |
| 4,292,572 | 9/1981 | Ivy | 318/52 |
| 4,335,337 | 6/1982 | Okamatsu et al. | 318/52 |
| 4,373,147 | 2/1983 | Carlson, Jr. | 318/48 |
| 4,375,047 | 2/1983 | Nelson et al. | 318/48 |
| 4,546,294 | 10/1985 | Ban et al. | 318/311 |
| 4,645,991 | 2/1987 | Ban et al. | 318/331 |
| 4,884,333 | 12/1989 | Cooper et al. | 29/596 |
| 4,954,739 | 9/1990 | Schultz et al. | 310/156 |
| 4,961,017 | 10/1990 | Kakinoki et al. | 310/71 |
| 5,043,617 | 8/1991 | Rostron | 310/112 |
| 5,095,238 | 3/1992 | Suzuki et al. | 310/156 |
| 5,194,773 | 3/1993 | Clarke | 310/112 |
| 5,200,659 | 4/1993 | Clarke | 310/112 |
| 5,220,259 | 6/1993 | Werner et al. | 318/432 |
| 5,223,775 | 6/1993 | Mongeau | 318/432 |
| 5,295,808 | 3/1994 | Machida et al. | 417/366 |

FOREIGN PATENT DOCUMENTS 54-113018  9/1979  Japan .

*Primary Examiner*—Thomas M. Dougherty
*Assistant Examiner*—Jonathan Link
*Attorney, Agent, or Firm*—Christie, Parker & Hale, LLP

[57] ABSTRACT

First and second stationary driving coils are disposed about drive shaft means on which magnetized rotor means are mounted so as to exert on the drive shaft means output torques 90 degrees out of phase with each other. Coupling means connect the drive shaft means to an output shaft so as the combine the output torques. Sinusoidal driving signals for the driving coils are generated by Hall devices or other means synchronized to the drive shaft means.

2 Claims, 23 Drawing Sheets

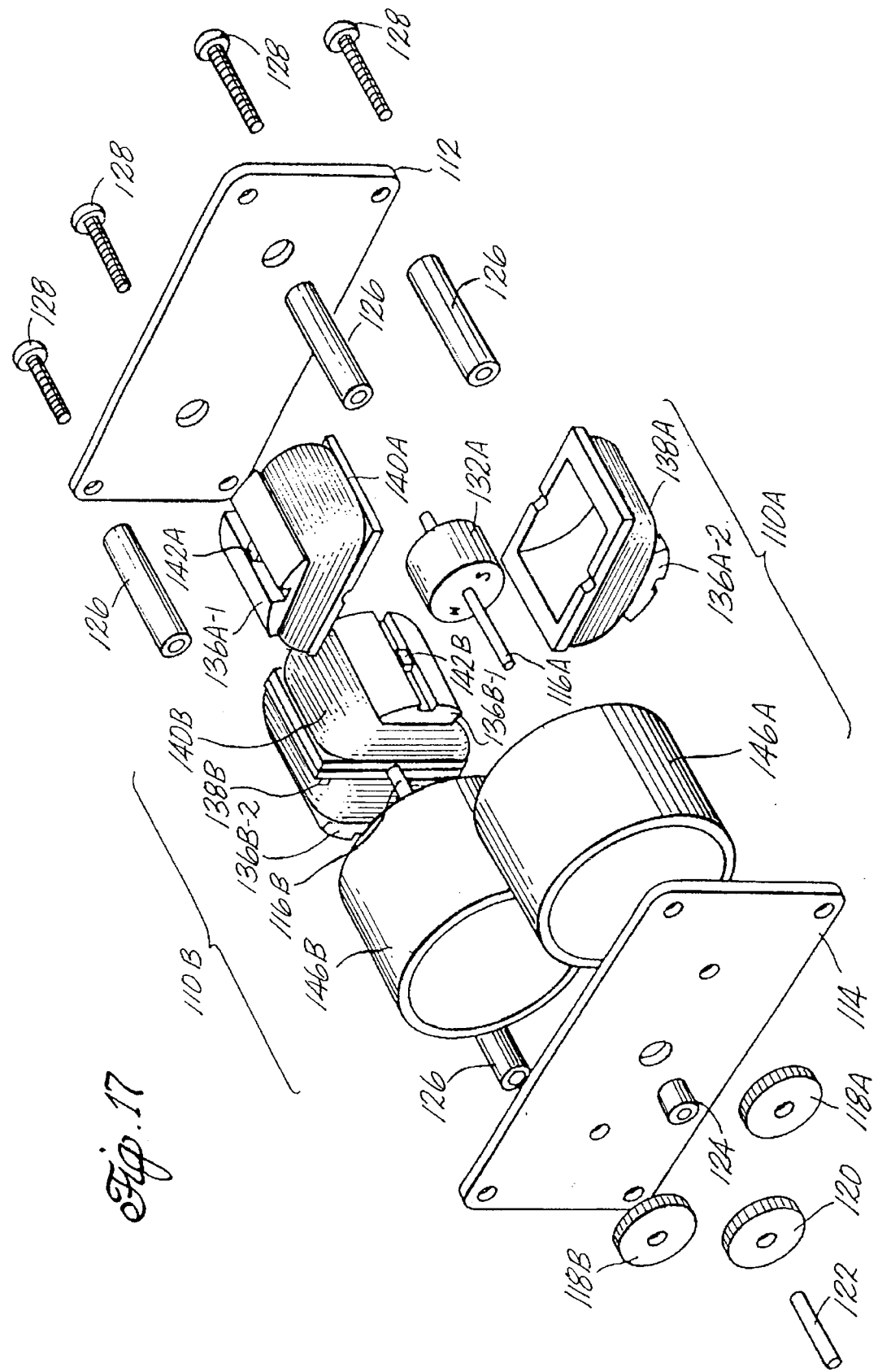

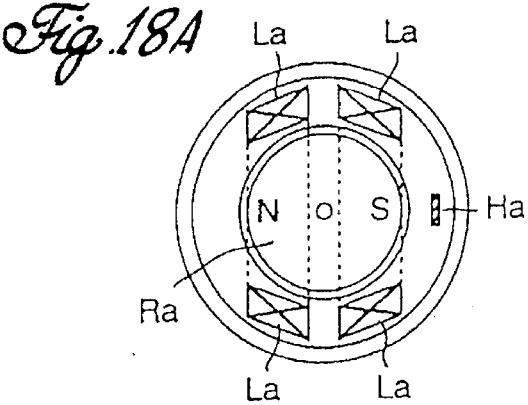
MOTOR A
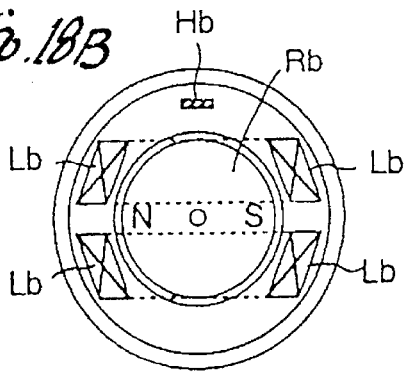
MOTOR B
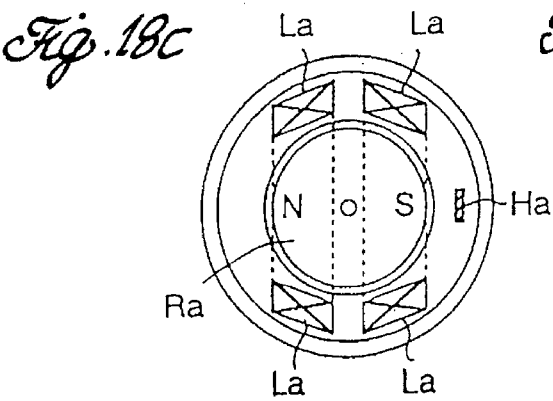
MOTOR A
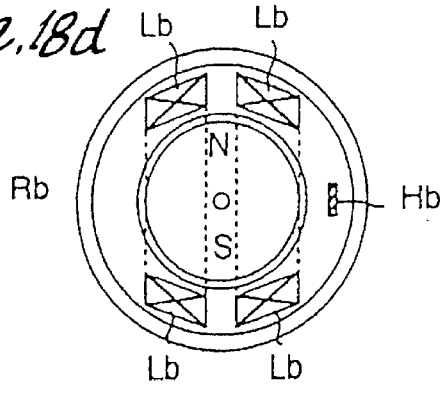
MOTOR B
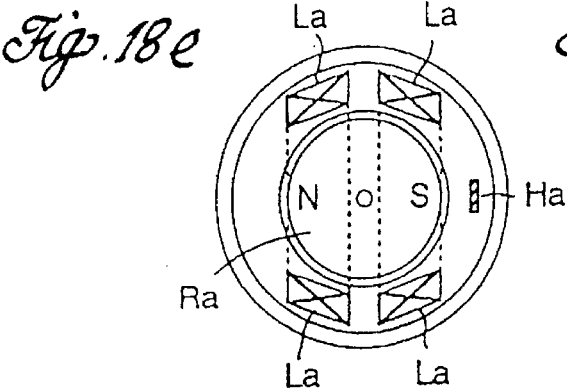
MOTOR A
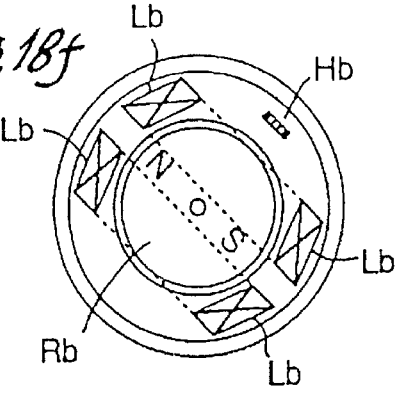
MOTOR B

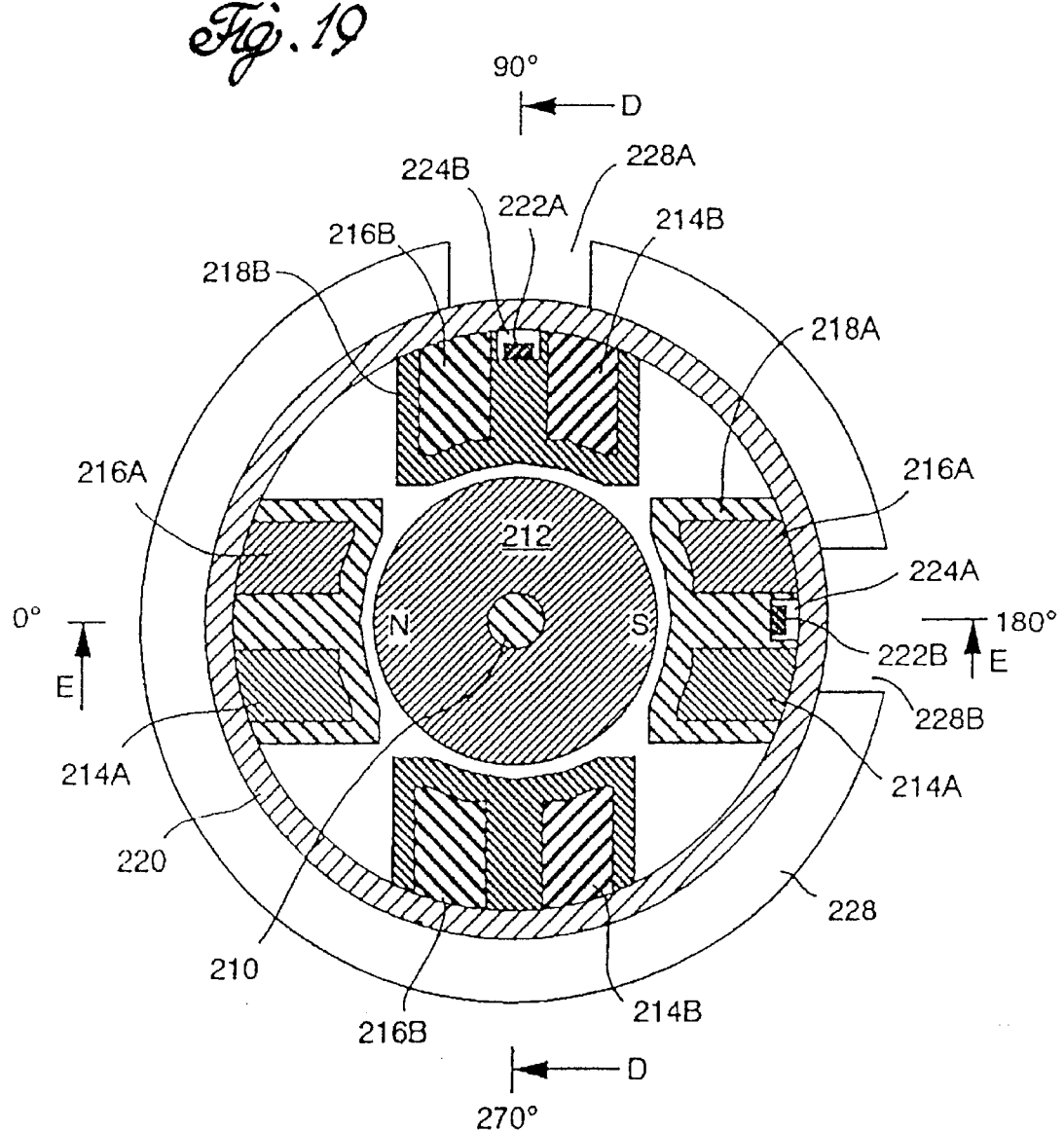

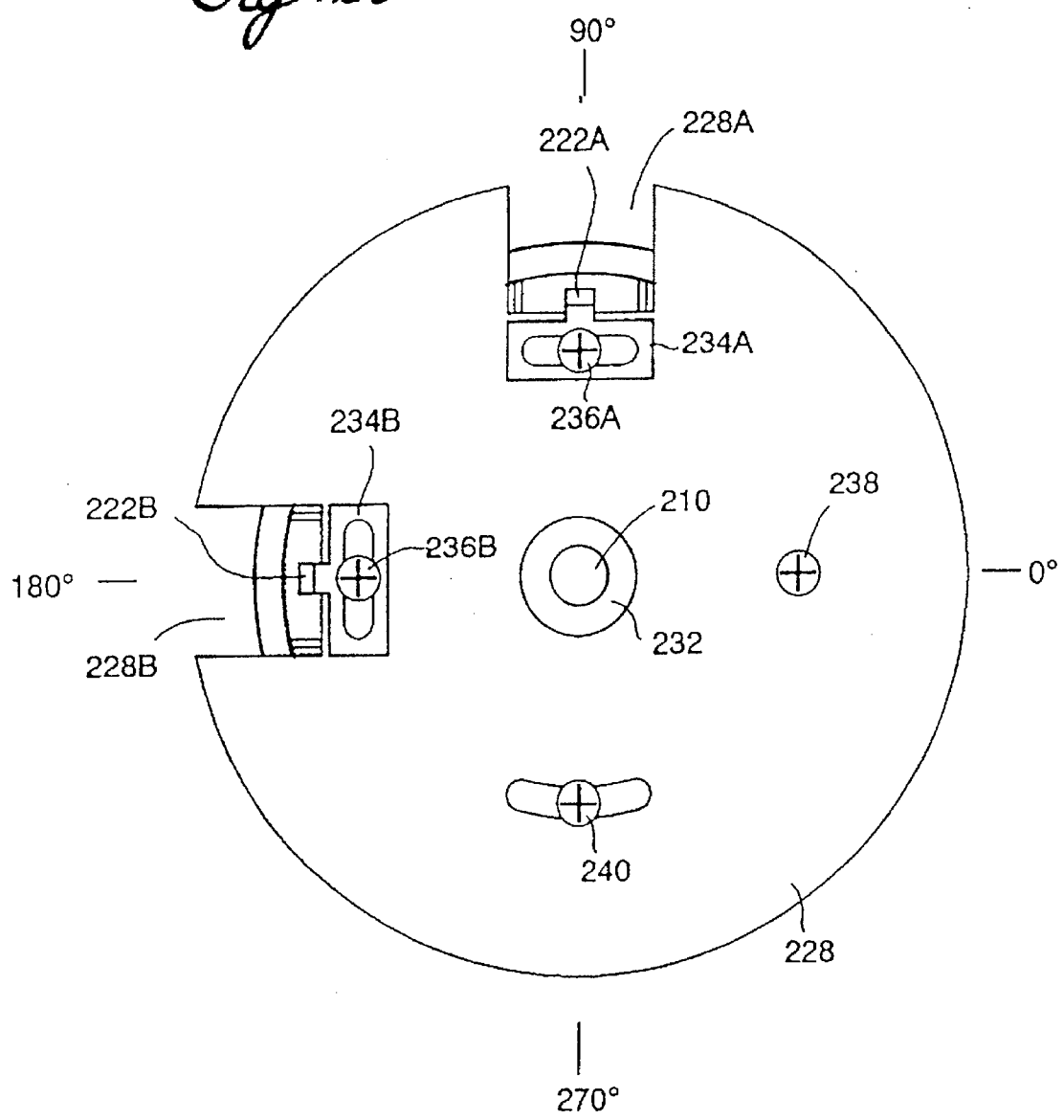

ACTUATING APPARATUS AND ACTUATOR

BACKGROUND OF THE INVENTION

This invention relates to an actuating apparatus and an actuator.

There is a demand for actuators for electric driving control, having a high torque at a low speed and readily controlled in speed and phase. Conventional actuators were combinations of a d.c. motor, or an a.c. motor, and a reduction gear for stepping down the motor output speed.

In such arrangements using a reduction gear system, the d.c. motor, or a.c. motor, has a speed of rotation as high as several thousands r.p.m. which causes the reduction gear to be worn out in a relatively short time of use, resulting in a short life of about 3,000 hours. Also, d.c. motors including a brush typically have short lives because the brush is worn out.

Brushless motors using a permanent magnet as a rotor and movable-magnet motors are long-life actuators that can rotate at relatively low speeds. In a brushless motor, the rotor can be in a desired direction at a desired speed by applying to a field coil of a stator a pulsating current inverted in polarity in synchronism with the rotation phase of the rotor. A magnetic sensor such as a Hall element is used as rotation detecting means to detect the rotating phase of the rotor such that a resultant detection output is used to switch the current to be applied to the field coil.

FIG. 2 shows a cross-sectional view of one of such prior typical brushless motors. A cylindrical yoke 10 accommodates a bobbin 14 on which a field coil 12 is wound. A rotor 16 in the form of a cylindrical (or disk-like) permanent magnet is held in the cylindrical interior space of the bobbin 14. The rotor 16 is spaced apart from the bobbin 14 by a constant distance. A Hall element 18 is located at an appropriate circumferential position of the bobbin 14, which may be a position where it intersects with the coil plane of the field coil 12, and it is oriented such that the sensitive direction coincides with the exciting direction of the field coil 12.

FIG. 3 is a diagram showing torque output characteristics and Hall element output characteristics with a constant voltage being applied to the field coil 12. The torque output characteristics and the Hall element output characteristics exhibit clean sinusoidal waveforms. As shown in FIG. 3, the output characteristics of the Hall element 18 and the torque characteristics are different in phase by 90 degrees. Since the torque becomes negative at the point just beyond 180 degrees, the rotor 16 can be continuously rotated in the same direction by applying the opposite-polarity voltage to the field coil 12. FIG. 4 shows a waveform diagram of the output torque characteristics and the voltage applied to the field coil 12 during rotation in one direction. In FIG. 4, (1) is the output torque characteristics, and (2) is the voltage to the field coil 12. The output torque characteristics represent the absolute value of a sinusoidal wave.

It is desired that an actuator has a long life not less than 10,000 hours at a low speed of rotation and can move quietly and smoothly. It is also desired for an actuator to be precisely controlled in speed and position. In this regard, it is desired that a wide speed range can be realized without using a reduction gear and that the output torque includes no or quite a few ripple components. However, no existing apparatus satisfies the requirements.

It is therefore an object of the invention to provide an actuating apparatus and an actuator which satisfy the requirements referred to above.

SUMMARY OF THE INVENTION

In one aspect of the invention, a first and a second motors having output torque characteristics of sinusoidal waveforms relative to their rotating angles are coupled in their longitudinal direction (end-to-end relation) or in parallel (side-by-side relation), or joined on a common output shaft such that their output torques are different in phase substantially by 90 degrees.

The actuating apparatus or actuator may include a driving circuit for providing continuous rotation, which may be constituted by a first driving means for supplying the first motor with a driving signal having a sinusoidal waveform in synchronism with the output torque of the first motor, and a second driving means for supplying the second motor with a driving signal having a sinusoidal waveform in synchronism with the output torque of the second motor. The first driving means preferably includes a first rotation detecting means for detecting rotation of the second motor, and a first driving signal generating means, responsive to a detection output of the first rotation detecting means, for generating a driving signal having a sinusoidal waveform which is changed in sinusoidal waveform with rotational angle detected. The second driving means includes a second rotation detecting means for detecting rotation of the first motor, and a second driving signal generating means, responsive to a detection output of the second rotation detecting means, for generating a sinusoidal driving signal which changes in sinusoidal waveform with rotational angle detected.

The actuating device or actuator may include a driving circuit for enabling remote control of the rotating angle, which includes a first rotation detecting means for detecting rotation of the first motor and outputting a sinusoidal signal of a phase responsive to the rotating angle detected, a first differential amplifier means for outputting a difference between an output from the first rotation detecting means and a first external input, a first power amplifier means for power-amplifying an output from the first differential amplifier means and applying the power-amplified signal to a driving coil of the first motor, a second rotation detecting means for detecting rotation of the second motor and outputting a sinusoidal wave of a phase responsive to the rotating angle detected, a second differential amplifier means for outputting a difference between an output from the second rotation detecting means and a second external input, and a second power amplifier means for power-amplifying an output from the second differential amplifier means and applying the power-amplified signal to a driving coil of the second motor.

In a further aspect of the invention, an actuator includes a rotor secured on an output shaft and having two magnetic poles, a first and a second driving coils disposed in a crossing relation, and a rotation detecting means for detecting the rotating angle of the rotor.

The actuator may include driving means for providing continuous rotation, which may be constituted by a first driving means for supplying the first driving coil with a sinusoidal driving signal in synchronism with the output torque generated in the rotor by the first driving coil, and a second driving means for supplying the second driving coil with a sinusoidal driving signal in synchronism with the output torque generated in the rotor by the second driving coil.

The actuator may further include a driving circuit for enabling remote control of the rotating angle, which includes a first rotation detecting means for detecting rotation of the rotor and outputting a sinusoidal signal shifted in phase substantially by 90 degrees from the output torque generated by the first driving coil, a first differential amplifier means for outputting a difference between the output from the first rotation detecting means and a first external input, a first power amplifier means for power-amplifying the output from the differential amplifier means and applying the power-amplified signal to the first driving coil, a second rotation detecting means for detecting rotation of the rotor and outputting a sinusoidal signal different in phase substantially by 90 degrees from the output torque generated by the second driving coil, a second differential amplifier means for outputting a difference between the output from the second rotation detecting means and a second external input, and a second power amplifier means for power-amplifying the output from the second differential amplifier means and outputting the power-amplified signal to the second driving coil.

The first and second motors or the first and second coils driven by the first and second driving means or circuits respectively generate output torques which change with the square of a sinusoidal wave and with the square of a cosine wave. As a result, the resulting composite torque exhibits a constant value, that is, ideally no ripple appears.

The features of the invention contribute to a simpler mechanical and circuit arrangement adaptive to a wider range of rotational speeds, and hence contributes to miniaturization of the actuator or actuating apparatus.

Since a constant relation is established between the driving current and the composite output torque, the actuator or actuating apparatus according to the invention makes it easy to measure load torques and generate desired constant torques, and hence may be used as a torque measurement apparatus or as a constant torque generating device.

In the driving circuit referred to above, the first motor or the first driving coil generates a torque oriented to a rotational position according to the first external input, and the second motor or the second driving coil generates a torque oriented to a rotational position according to the second external input. The first motor or the first driving coil and the second motor or the second driving coil generate torques different in phase by 90 degrees, and their composite value theoretically becomes constant such that they rotate to the rotational positions designated by the first and second external inputs.

The foregoing and other objects, features and advantages of the invention will become more apparent in the light of the following description of preferred embodiments thereof, as illustrated in the accompanying drawings.

BRIEF DESCRIPTION OF THE DRAWINGS

The features of specific embodiments of the best mode contemplated of carrying out the invention are illustrated in the drawings, in which:

FIG. 17 is an exploded perspective view of the actuator shown in FIG. 15;

FIG. 18 consisting of FIGS. 18A through 18F shows examples different in magnetic direction of rotors and in positional relationship between driving coils and Hall elements in actuators having two motors coupled in an axial (end-to-end) or parallel (side-by-side) relationship;

FIG. 19 is a transversal cross-sectional view of a unitary type actuator as a further embodiment of the invention, taken along a plane perpendicular to a rotating shaft;

FIG. 20 is a back elevational view of the actuator shown in FIG. 19;

DESCRIPTION OF THE PREFERRED EMBODIMENTS

Figure 1:
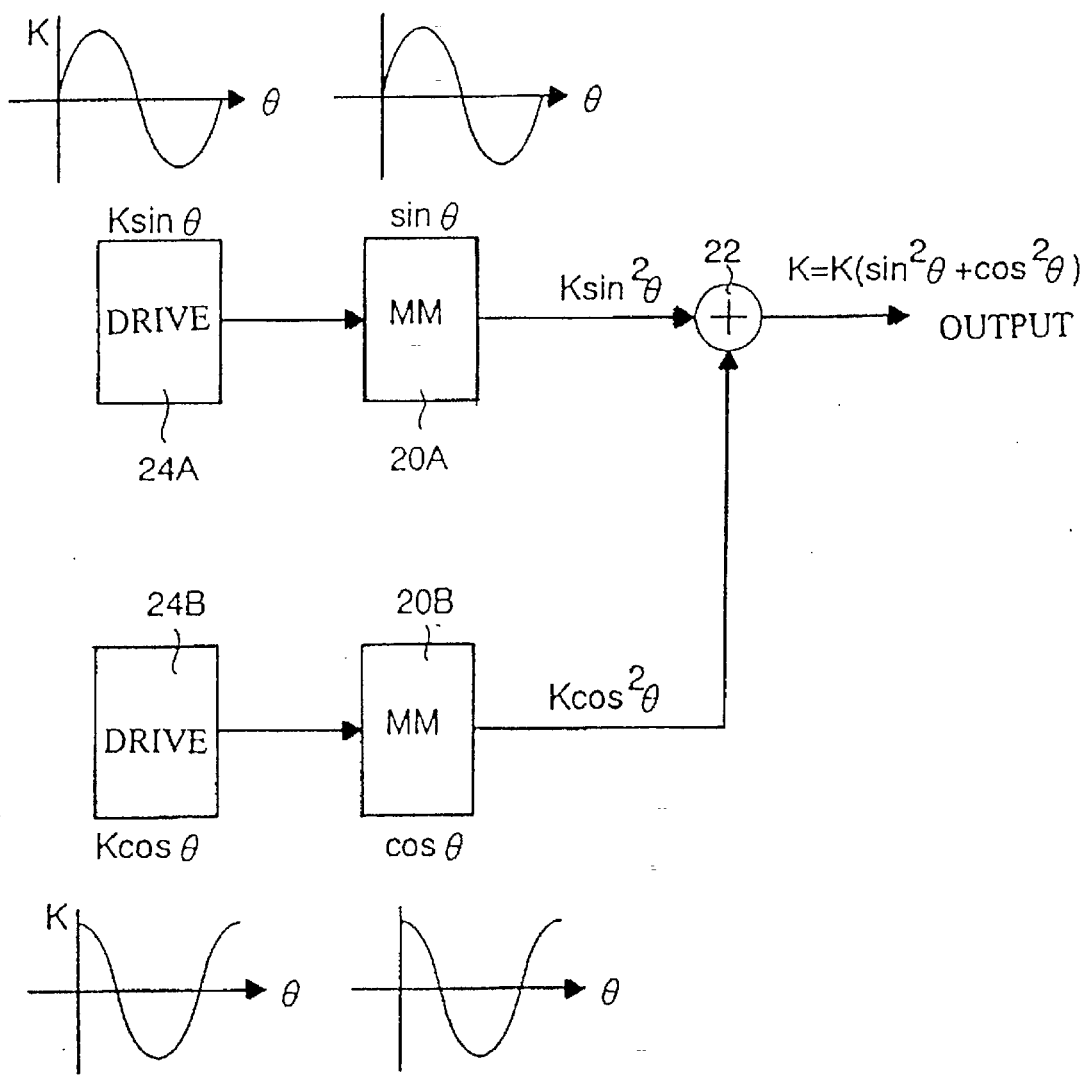
FIG. 1 is a diagram showing the basic principle of the present invention
Figure 2:
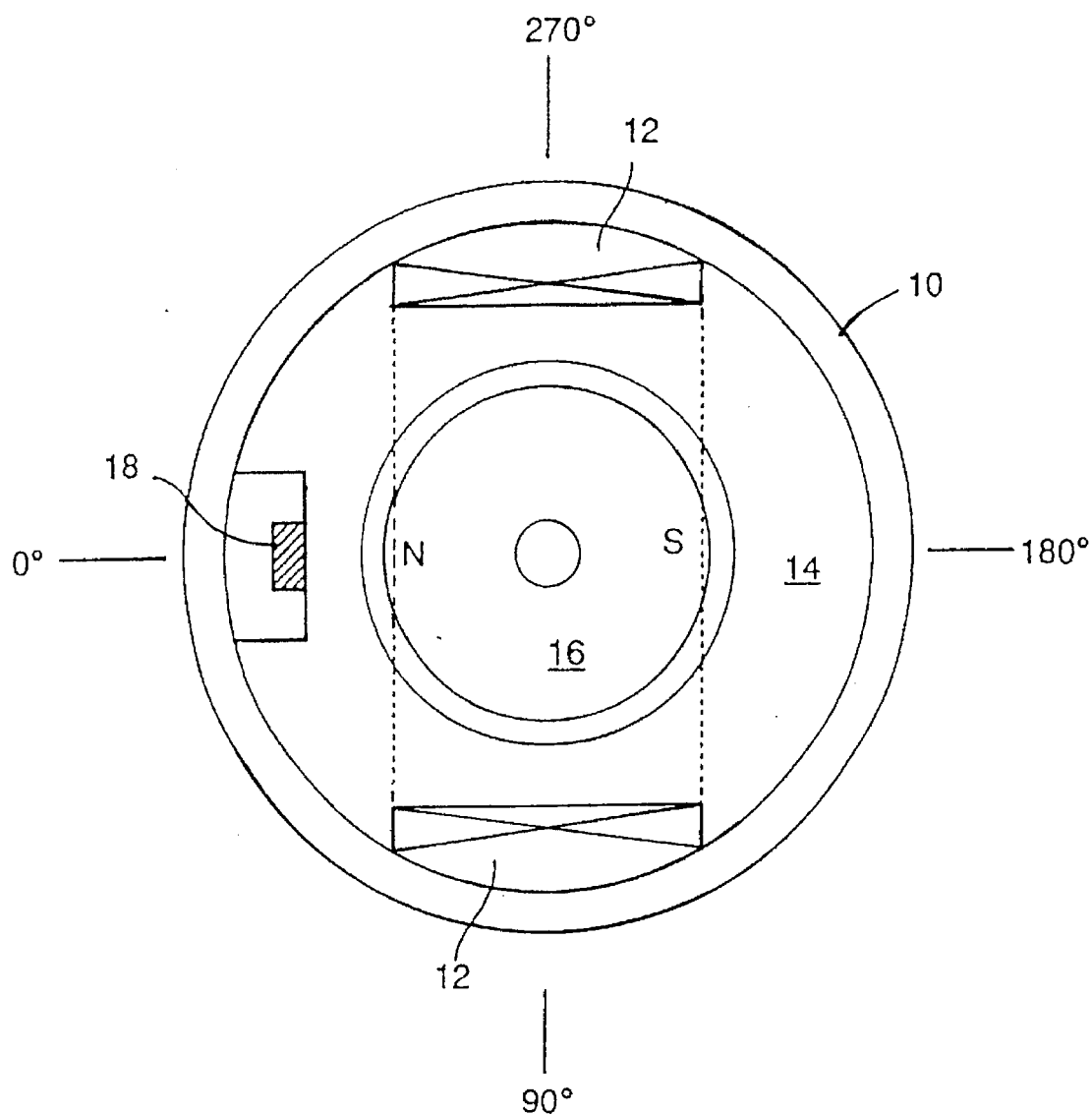
FIG. 2 is a cross-sectional view of a brushless motor.

The basic concept of the invention is first explained with reference to FIG. 1. Motors 20A, 20B, such as brushless motors as shown in FIG. 2, have output torque characteristics of sinusoidal waveforms shown in FIG. 3 with respect to a constant driving current supplied thereto. Their outputs are mechanically added by a coupling member 22 in electrically different phases by 90 degrees to form a composite output. Driving circuits 2A, 24B supply the respective motors 20A, 20B with sinusoidal driving currents coinciding in phase with the respective output torques of the motor 20A (or 20B).

If the output torque characteristics of the motor are represented by $\sin\theta$, and those of the motor 20B by $\cos\theta$, then the driving circuit 24A applies a driving current of $K\sin\theta$ (K is a proportional constant) to the motor 20A, and the driving circuit 24B applies a driving current of $K\cos\theta$ to the motor 20B. As a result, the output torque of the motor 20A becomes $K\sin^2\theta$, and the output torque of the motor 20B becomes $K\cos^2\theta$. The sum of the output torques of the motors 20A, 20B, i.e. the composite output torque becomes:

$$K\sin^2\theta + K\cos^2\theta = K$$

and, as represented by the above equation, the composite output torque theoretically includes no ripple.

The driving circuits 24A, 24B may comprise a single sinusoidal wave generating circuit directly connected to motor 20A and connected by a 90 degree phase shifting circuit to motor 20B. However, for applications in wide frequency ranges including those near the d.c. range, it would be difficult to design a sinusoidal wave generating circuit and a phase shifting circuit adaptive to the wide frequency range, or even if possible, the circuits would become undesirably large-scaled.

Figure 3:
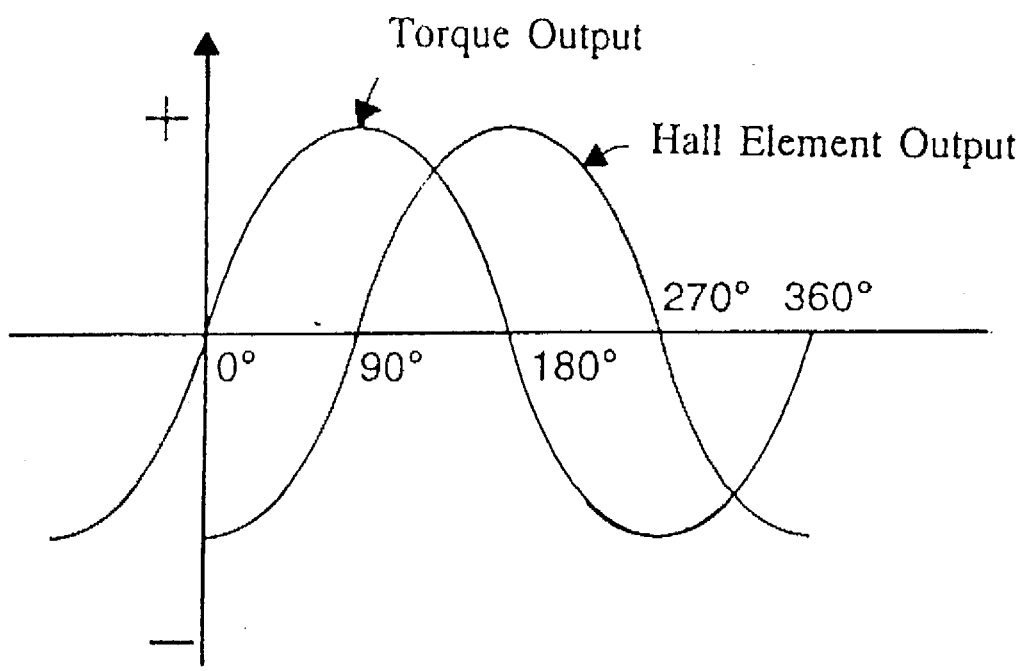
FIG. 3 is a diagram showing characteristics of a torque output and of a Hall element output with a constant voltage applied to a field coil 12 in FIG. 2.
Figure 4:
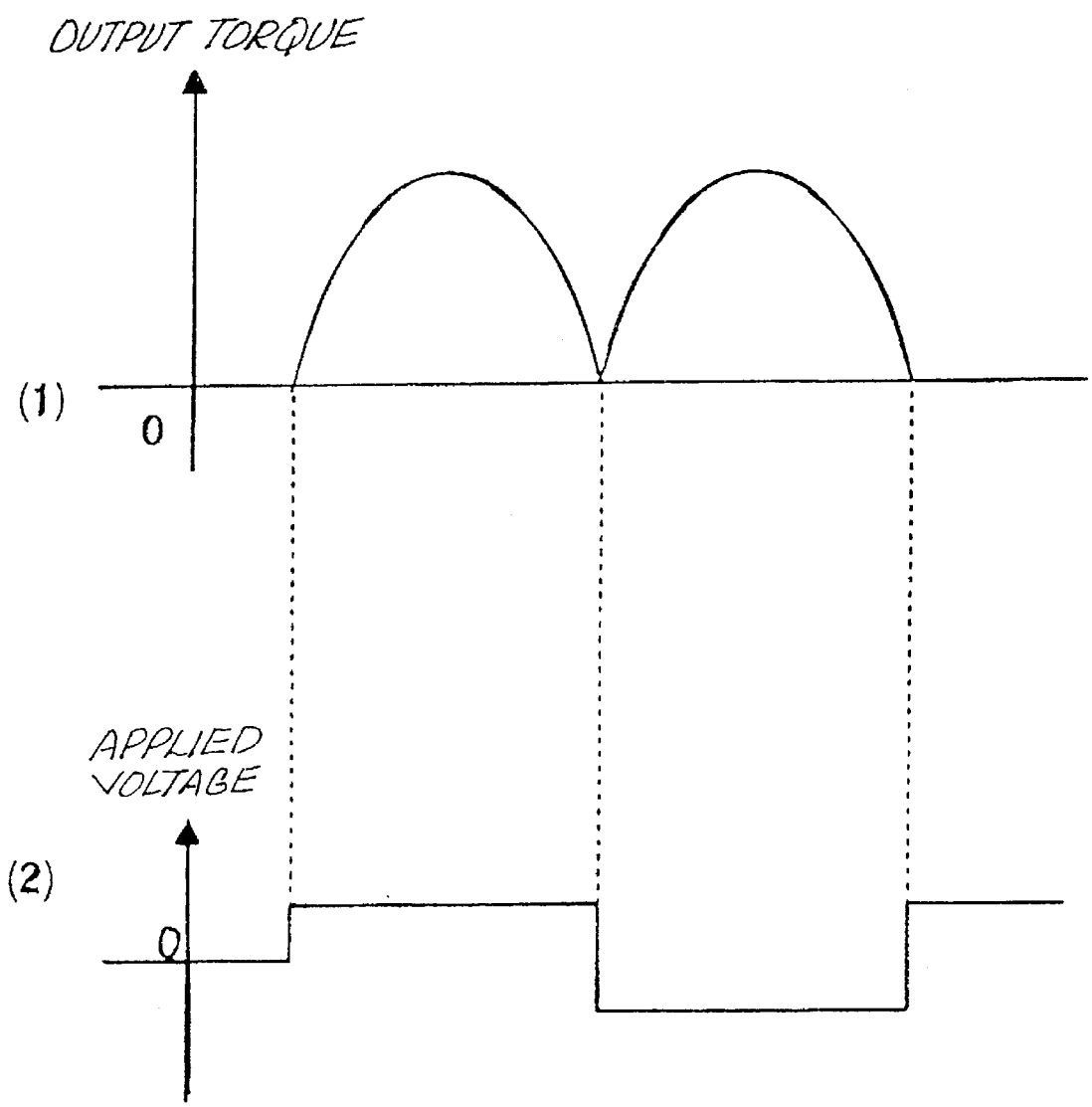
FIG. 4 is a diagram of waveforms of the output torque characteristics and of the voltage applied to the field coil 12 in the motor of FIG. 2 while being rotated in one direction.
Figure 5:
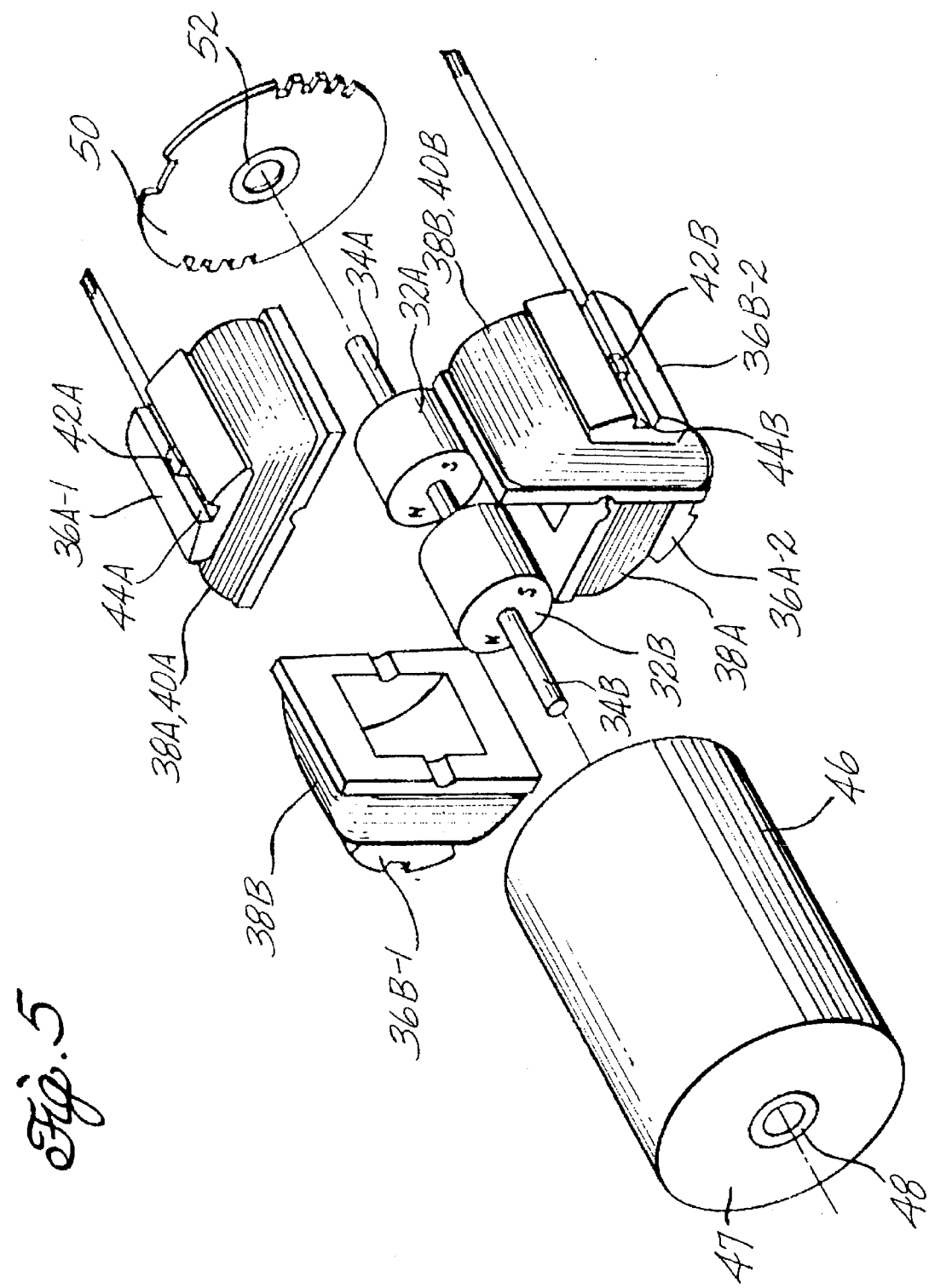
FIG. 5 is an exploded perspective view of an actuator taken as a first embodiment of the invention.
Figure 6:
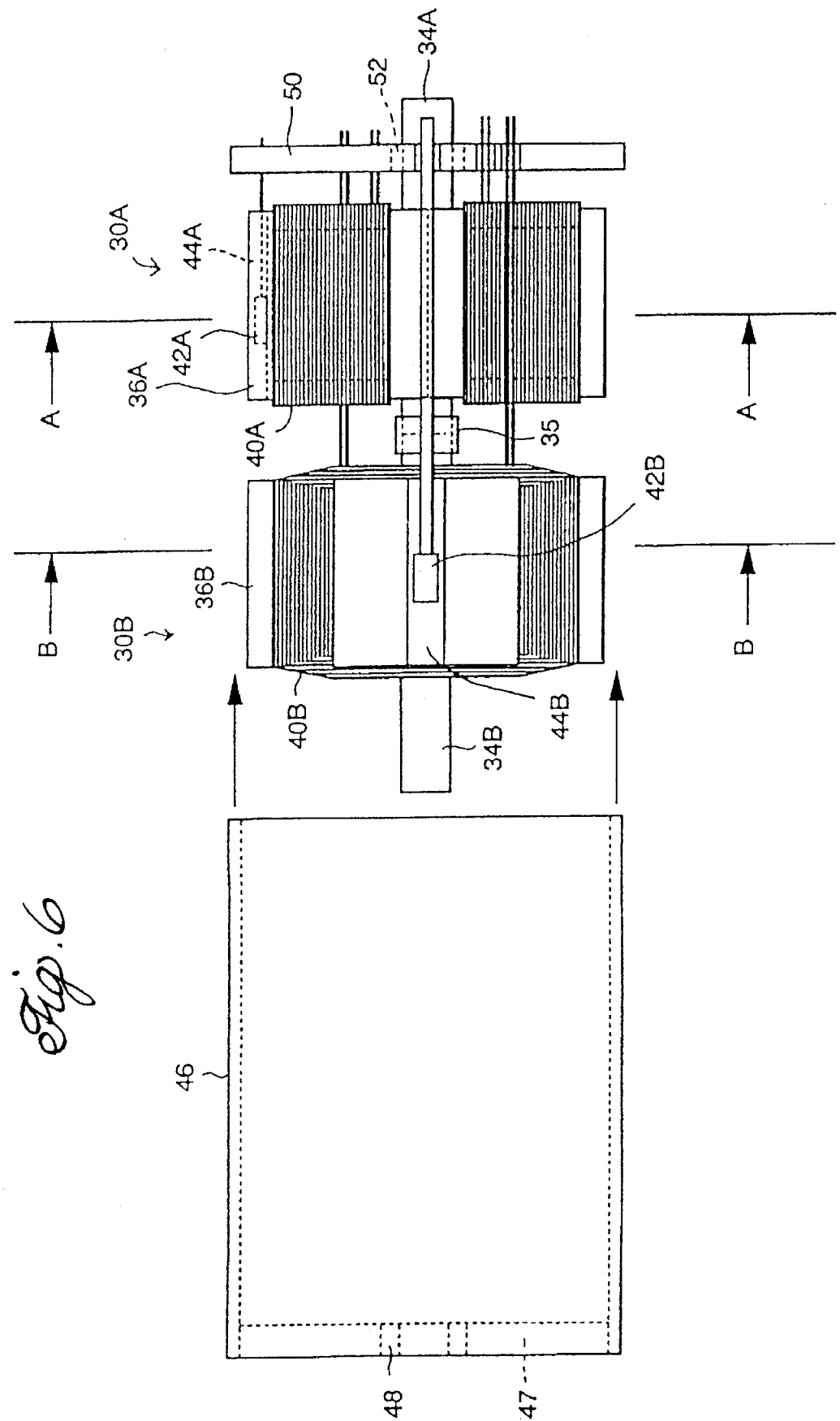
FIG. 6 is a side elevational view of the actuator shown in FIG. 5.
Figure 7:
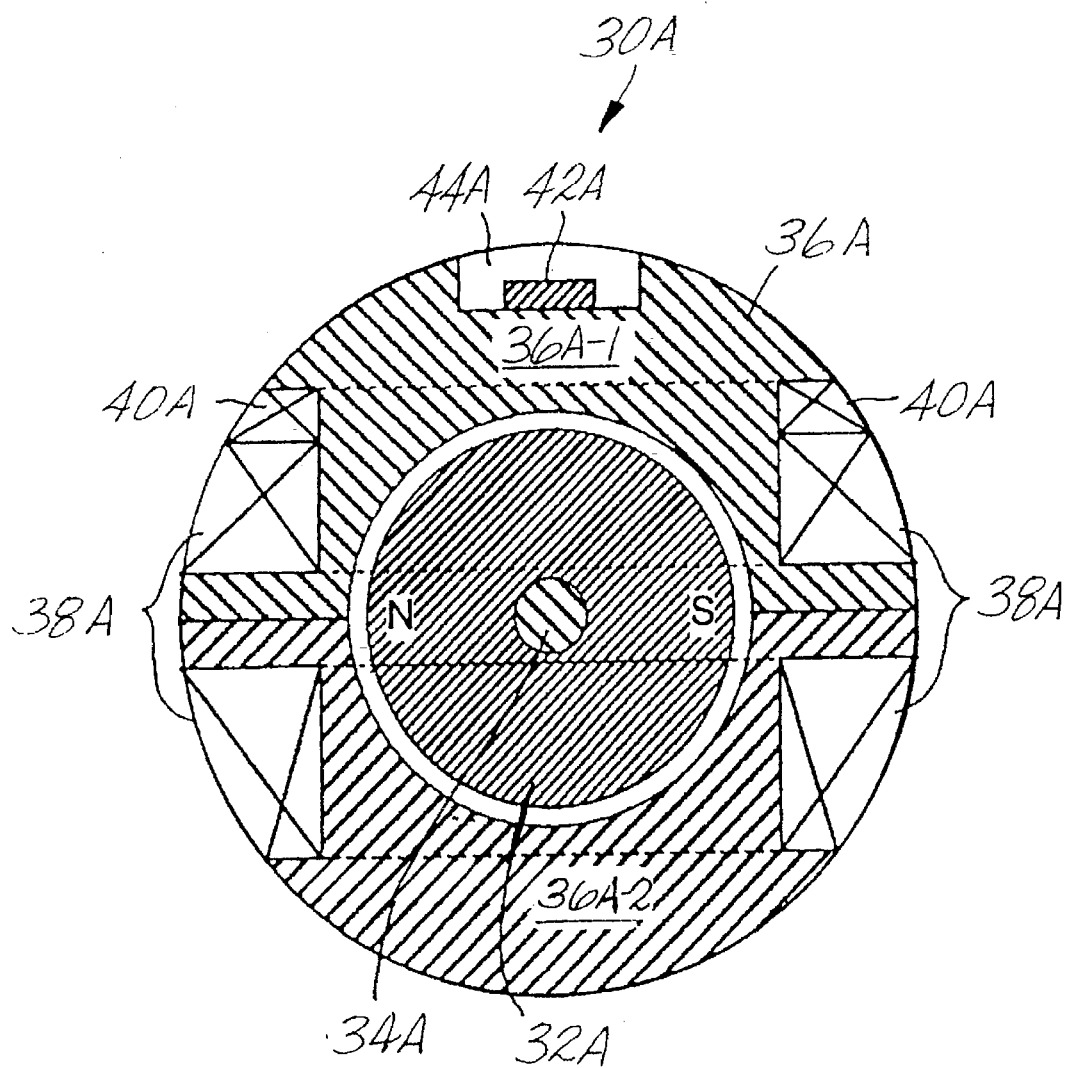
FIG. 7 is a cross-sectional view of the actuator taken along the A—A line of FIG. 6.
Figure 8:
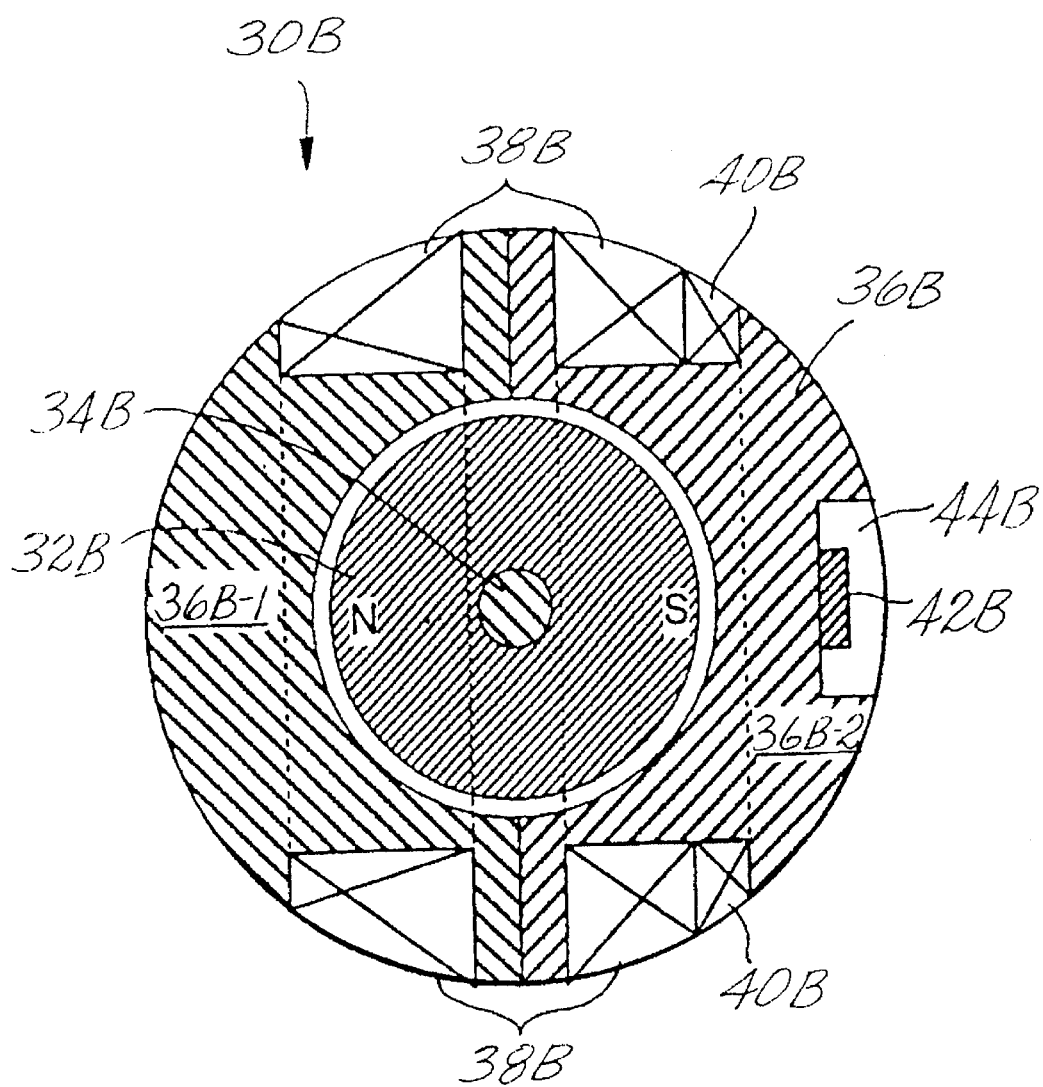
FIG. 8 is a cross-sectional view of the actuator taken along the B—B line of FIG. 6.

As having explained on a brushless motor with reference to FIGS. 2 to 4, when the Hall element 18 is disposed in a position where it intersects with the coil plane, that is, on a center line passing through the field coil 12, then the Hall element 18 is remotest from the field coil 12. As a result, the magnetic field generated by the field coil 12 is much weaker as compared with the magnetic field generated by the rotor 16 at the position of the Hall element 18, and the value may be essentially disregarded. As a result, the output from the Hall element 18 exhibits a sinusoidal waveform not affected by the magnetic field generated by the field coil 12. Further, when the sensitive direction of the Hall element 18 coincides with the exciting direction of the field coil 12, then the output from the Hall element 18 exhibits a sinusoidal waveform shifted in phase by 90 degrees from the output torque.

Therefore, the driving circuit 24A is preferably designed to amplify the Hall element output of the motor 20B while maintaining its waveform and phase and to thereafter apply it as a driving voltage to the motor 20A. Similarly, the driving circuit 24B is desirably designed to apply the Hall element output of the motor 20A while maintaining the waveform and phase thereof. This arrangement of the driving circuits 24A, 24B is adaptive to a wide frequency range including those near the d.c. range.

Now explained below is a first embodiment of the invention with reference to FIGS. 5 to 8. In this embodiment, two brushless motors 30A, 30B having substantially the same configuration are coupled in their axial direction (in an end-to-end relationship). Rotating shafts 34A, 34B of the rotors 32A, 32B are coaxially, firmly connected by a coupling member 35. As can be appreciated, the rotating shafts 34A, 34B may be replaced by a single unitary rotating drive shaft. The rotors 32A, 32B are disk-shaped or cylindrical members each having one S pole and one N pole along its circumference. In the particular embodiment, the magnetizing direction of the rotor 32A coincides with that of the rotor 32B.

Disposed outside the rotors 32A, 32B are bobbins 36A and 36B spaced by equal gaps from their respective rotors. Each of the bobbins 36A, 36B is composed of two divisional halves 36A-1, 36A-2, or 36B-1, 36B-2, which are joined together, respectively.

The bobbin 36A of the motor 30A bears parallel windings of a field-producing driving coil 38A and an auxiliary coil 40A for assisting, controlling or braking the driving. Similarly, the bobbin 36B of the motor 30B bears parallel windings of a field-producing driving coil 38B and an auxiliary coil 40B for assisting, controlling or braking the driving action.

The bobbins 36A and 36B are supported by support members (not shown) to hold a predetermined positional relationship between the driving coils 38A and 38B. Preferably, one of the bobbins 36A and 36B may be movably supported to permit its positional adjustment.

Hall elements 42A and 42B for detecting the rotational phases of the rotors 32A and 32B are provided at positions along lines perpendicular to the coil planes of the driving coils 38A and 38B and are oriented such that their sensitive directions coincide with exciting directions of the driving coils 38A and 38B. As a result, when considering a respective one of the motors 30A and 30B, the Hall element 42A outputs a sinusoidal voltage different in phase by 90 degrees from the output torque of the motor 30A, and the Hall element 42B outputs a sinusoidal voltage different in phase by 90 degrees from the output torque of the motor 30B. The bobbins 36A and 36B have recesses 44A and 44B on their outer surfaces to accommodate the Hall elements 42A and 42B.

The above-described assembly is received in a cylindrical yoke 46. The yoke 46 is open-ended at one end but close-ended at the other end by attaching a non-magnetic plate member 47. Embedded in the center of the plate member 47 is a bearing 48 rotatably supporting the rotating shaft 34B. After the assembly of rotors 32A, 32B, and bobbins 36A, 36B are inserted in the yoke 46, the open end of the yoke 46 is also closed by an end plate 50. Also provided in the center of the end plate 50 is a bearing 52 for rotatably supporting the rotating shaft 34A. The end plate 50 has some cutouts through which lead wires for the driving coils 38A, 38B and the auxiliary coils 40A, 40B of the motors 30A, 30B and lead wires in the form of flexible printed boards for the Hall elements 42A, 42B may pass.

When a constant current is applied to a brushless motor such as the motors 30A, 30B, output torque characteristics and Hall element output characteristics exhibit substantially ideal sinusoidal characteristics. Therefore, in the embodiment shown in FIGS. 5 to 8, by offset-adjusting and amplitude-adjusting outputs of the Hall element 42A, 42B, subsequently amplifying the outputs, and applying them to the driving coils 38B, 38A, respectively, currents with sinusoidal waveforms in the desired phases flow through the driving coils 38A, 38B.

Figure 9:
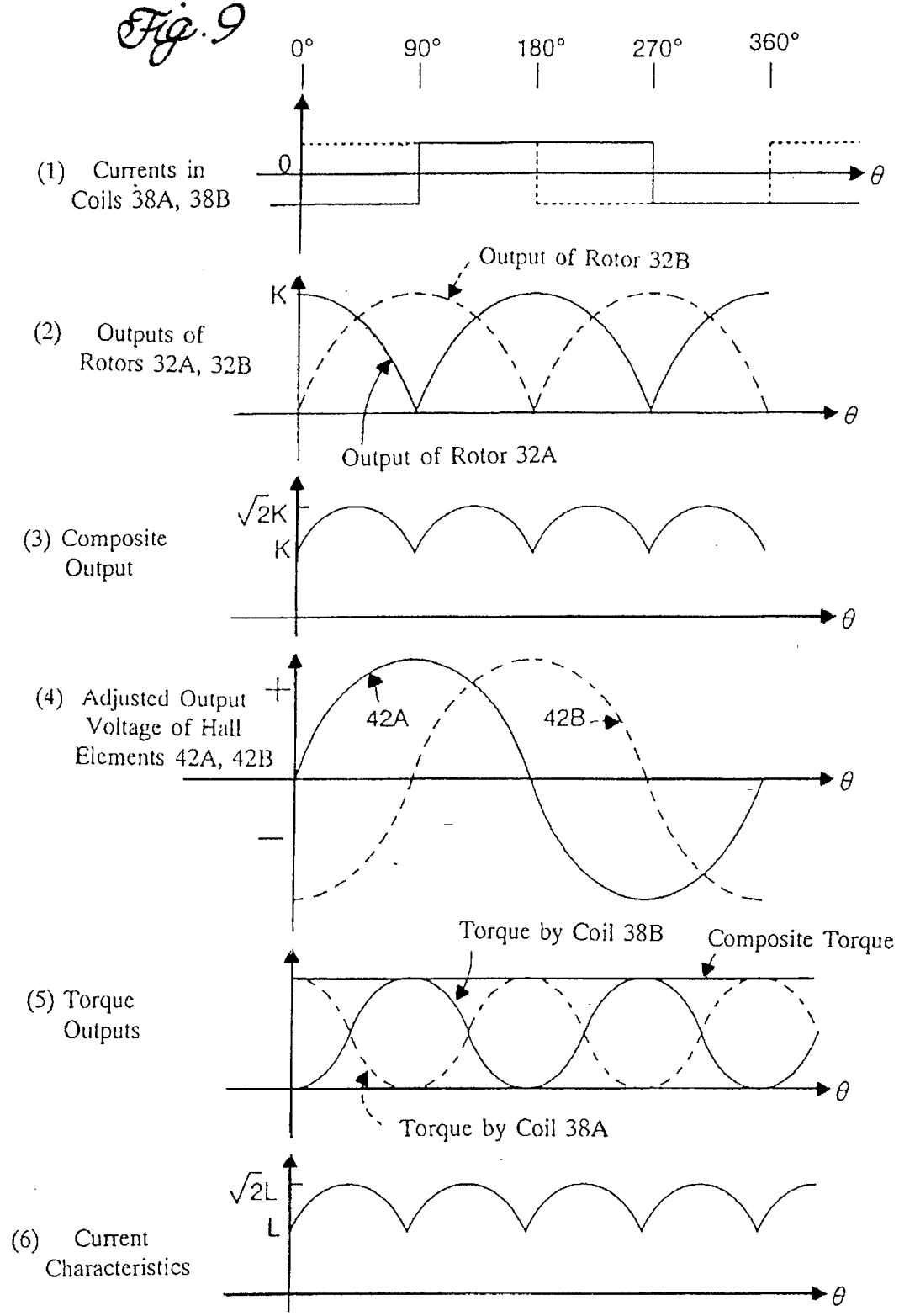
FIG. 9 is a waveform diagram showing characteristics of the first embodiment.

More specifically, when pulsating signals of constant currents changed in polarity at predetermined intervals are applied to the driving coils 38A, 38B as shown in FIG. 9(1), the output torque of the rotor 32A exhibits the |cos θ| characteristic and the output torque of the rotor 32B exhibits the |sin θ| characteristic as shown in FIG. 9(2). By simply synthesizing these torques, the resulting composite torque includes large ripples as shown in FIG. 9(3).

As already explained, output signals of the Hall elements 42A, 42B responsive to rotation of the rotors 32A, 32B exhibit sinusoidal waveforms, and their offset-adjusted and amplitude-adjusted signals become as shown in FIG. 9(4). When the adjusted output voltages of the Hall elements 42A, 42B are applied to the driving coils 38B, 38A, respectively, the output torque of the motor 30A, the output torque of the motor 30B, and their composite torque become as shown in FIG. 9(5). That is, the output torque of the motor 30A changes at $\sin^2\theta$, and the output torque of the motor 30B changes at $\cos^2\theta$, and as a result, the composite torque remains constant with no ripple.

In order to realize the ideal condition shown in FIG. 9(5) with the arrangement where the rotating shafts are coupled such that the magnetic directions of the rotors of the two motors extend in parallel, it is necessary that the axes of the driving coils 38A and 38B be oriented to intersect, and that the Hall elements 42A, 2B be disposed at positions along lines perpendicular to coil planes of the driving coils 38A, 38B and be oriented such that their sensitive directions coincide with exciting directions of the driving coils 38A, 38B. If these requirements are not satisfied, ripples appear in the composite torque. It is particularly important for the axes of the driving coils 38A, 38B to intersect. In this respect, the embodiment shown in FIGS. 5 to 8 uses two motors 30A, 30B to enable free and accurate relative adjustment of positional and angular relations of the rotors 32A, 32B, the driving coils 38A, 38B, and the Hall elements 42A, 42B.

FIG. 9(6) shows a signal waveform made by adding the absolute value of the driving current flowing in the driving coil 38A and the absolute value of the driving current flowing in the driving coil 38B when a constant load is applied. The driving current I is related to rotational angle θ of the rotor as:

$$I = L(1 + 2|\sin\theta\cos\theta|)^{1/2}$$

where L is a proportional coefficient determined by actual measurement.

As will be explained later in greater detail, since the rotational angles of the rotors can be detected from the outputs of the Hall elements 42A, 42B, the proportional coefficients L of each actuator can be determined by a measured value of the driving current and the rotational angle of the rotor. By using the coefficient L thus determined, the output torque at any time is known from the driving current. That is, the relation between the output torque and the driving current is known on a quantitative basis, and the actuator may be used as a constant torque generator for generating a desired constant torque or as an apparatus for measuring torque.

Figure 10:
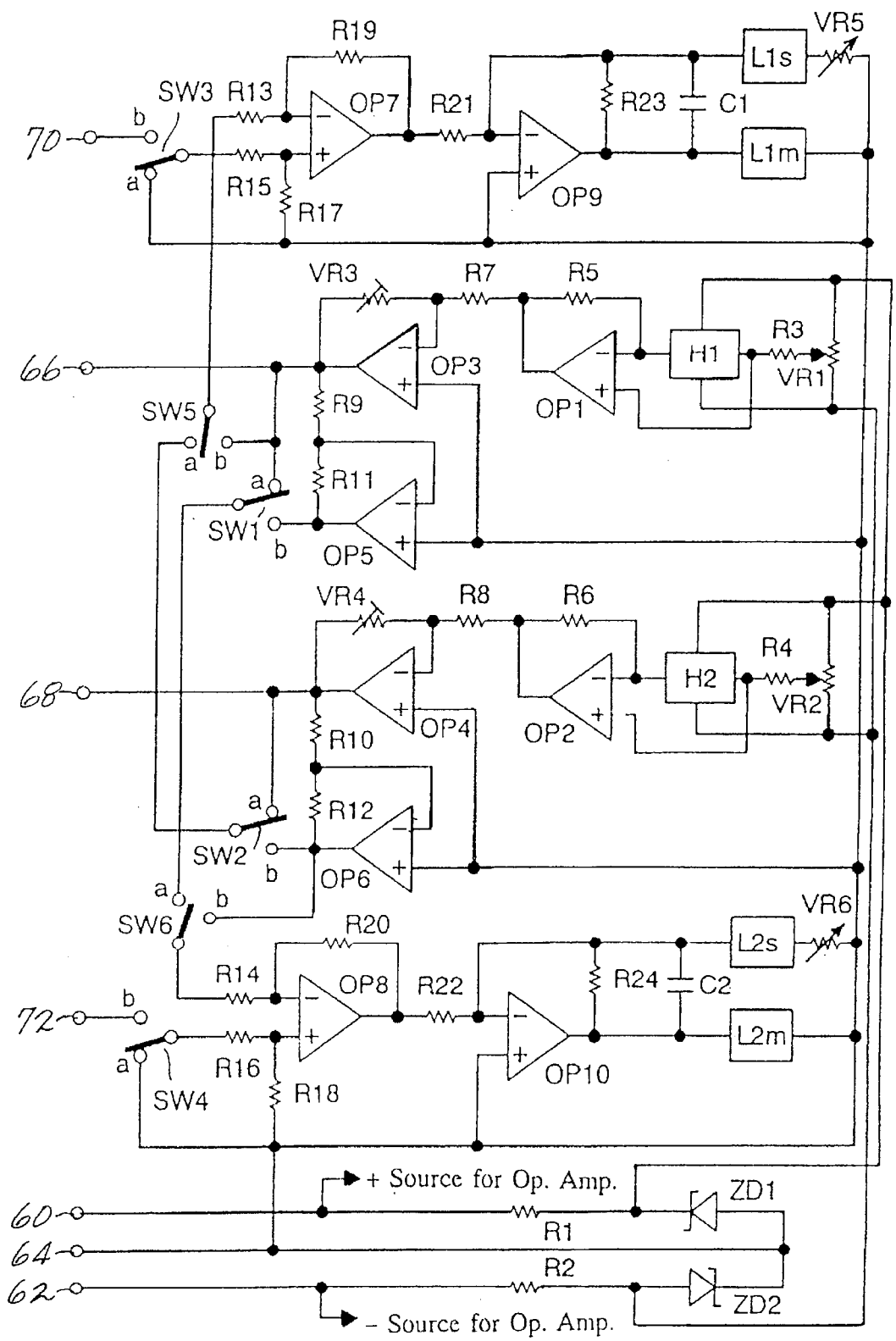
FIG. 10 is a circuit diagram of an exemplary driving circuit in the first embodiment.

FIG. 10 shows a driving circuit of the embodiment shown in FIGS. 5 to 8, by which external manipulation for forward rotation, reverse rotation and rotational position can be selected. In FIG. 10, L1m corresponds to the driving coil 38A, L1s to the auxiliary coil 40A, L2m to the driving coil 38B, L2s to the auxiliary coil 40B, H1 to the Hall element 42A, and H2 to the Hall element 42B.

Numeral 60 and 62 refer to power source input terminals through which voltages of +6 and −6 are supplied from a power source circuit not shown, and 64 designates a ground terminal. The power source input terminal 60 is connected to the ground terminal 64 via a resistor R1 and a constant voltage diode ZD1, and the power source input terminal 62 is connected to the ground terminal 64 via a resistor R2 and a constant voltage diode ZD2. The constant voltage diodes ZD1, ZD2 create constant voltages of about 5 V for applying constant currents to the Hall elements H1, H2. More specifically, the breakdown voltages of the constant diodes ZD1, ZD2 are about 2.5 V, and the Hall elements H1, H2 are supplied with a constant voltage produced between the cathode of the constant voltage diode ZD1 and the anode of the constant voltage diode ZD2. As a result, constant currents flow in the Hall elements H1, H2. A respective voltage output of the Hall elements H1, H2 is applied between an inverting input terminal and a non-inverting input terminal of operational amplifiers OP1, OP2. The non-inverted input terminals of the operational amplifiers OP1, OP2 are also supplied with d.c. voltages made by adjusting constant voltages from the constant voltage diodes ZD1, ZD2 by potentiometers VR1, VR2 and resistors R3, R4 connected to sliders of the potentiometers VR1, VR2. Thus the offsets of outputs from the Hall elements H1, H2 are adjustable. The outputs of the operational amplifiers OP1, OP2 are fed back to their inverting input terminals via resistors R5, R6. As a result, the circuits composed of the operational amplifiers OP1, OP2 and the resistors R5, R6 behave as inverting amplifiers, as well known, and inversely amplify the outputs of the Hall elements H1, H2.

The outputs of the operational amplifiers OP1, OP2 are connected to inverting input terminals of operational amplifiers OP3, OP4 through resistors R7, R8, and the outputs of the operational amplifiers OP3, OP4 are fed back to their inverting input terminals through semi-fixed resistors VR3, VR4. The circuit comprising the operational amplifier OP3 and the resistors R7, VR3 and the circuit comprising operational amplifier OP4 and the resistors R8 and VR4 can inversely amplify output voltages of the operational amplifiers OP1, OP2 with gains adjusted by the semi-fixed resistors VR3, VR4. That is, the outputs of the operational amplifiers OP3, OP4 are voltage signals made by amplifying the output voltages of the Hall elements H1, H2 to the desired amplitudes while maintaining their phases and waveforms.

The outputs of the operational amplifiers OP3, OP4 are connected to inverting input terminals of operational amplifiers OP5, OP6 via resistors R9, R10, and outputs of the operational amplifiers OP5, OP6 are fed back to their inverting input terminals through resistors R11, R12. By equalizing resistances of the resistors R10, R12 to those of the resistors R9, R11, respectively, the circuit composed of OP5, R9, R11 and the circuit composed of OP6, R10, R12 behave as polarity-inverting circuits, and the outputs of the operational amplifiers OP5, OP6 exhibit signals whose polarities have been inverted from the outputs of the operational amplifiers OP3, OP4.

The outputs of the operational amplifiers OP3, OP4 may also be taken out externally from the output terminals 66, 68. The adjusted output voltages of the Hall elements H1, H2 can thereby be externally monitored, and the signals indicative of their rotational phases and speeds can be obtained. The output signals of the output terminals 66, 68 correspond to the signals shown in FIG. 9(4).

The outputs of the operational amplifiers OP3, OP4 are connected to a-contacts of switches SW1, SW2, respectively, and the outputs of the operational amplifiers OP5, OP6 are connected to b-contacts of the same switches, respectively. The switches SW1, SW2 change over concurrently. For example, when the switch SW1 changes to the a-contact, the switch SW2 also changes to the a-contact. When the switch SW1 changes to the b-contact, the switch SW2 also changes to the b-contact. The interlocking relation between the switches SW1 and SW2 depends upon output characteristics of the Hall elements H1, H2.

The outputs from the common terminals of the switches SW2, SW1 are coupled to a-contacts of switches SW5, SW6, respectively. The b-contact of the switch SW5 is connected to the output of the operational amplifier OP3, and the b-contact of the switch SW6 is connected to the output of the operational amplifier OP6. The outputs from the common terminals of the switches SW5, SW6 are connected to inverting input terminals of operational amplifiers OP7, OP8, respectively, through resistors R13, R14. Numerals 70 and 72 denote input terminals of control voltage signals for controlling the actuator according to the embodiment to a desired rotational position by an operating device referred to later, and they are connected to b-contacts of switches SW3, SW4, respectively. Coupled to a-contacts of the switches SW3, SW4 is a ground potential from the ground terminal 64. The switches SW3, SW4 are in an interlocking relation like the switches SW1, SW2.

The common terminals of the switches SW3, SW4 are connected to the non-inverting input terminals of operational amplifiers OP7, OP8 through resistors R15, R16, respectively, and the non-inverting input terminals are connected to ground via resistors R17, R18. The outputs of the operational amplifiers OP7, OP8 are fed back to inverting input terminals through resistors R19, R20.

With this configuration the circuit composed of the operational amplifier OP7 and the resistors R13, R15, R17, R19 and the circuit composed of operational amplifier OP8 and resistors R14, R16, R18, R20 behave as differential amplifiers. This portion of the circuit is provided to enable external manipulation using a positional control signal introduced to input terminals 70, 72, but they may be omitted if such external manipulation is not desired.

The outputs of the operational amplifiers OP7, OP8 are connected to the inverting input terminals of operational amplifiers OP9, OP10 through resistors R21, R22, respectively. The non-inverting input terminals of the same amplifiers are connected to ground potential, and the outputs thereof are fed back to the inverting input terminals through resistors R23, R24. The circuit composed of OP9, R21, R23 and the circuit composed of OP10, R22, R24 behave as power amplifiers.

The outputs of the operational amplifiers OP9, OP10 are connected to ground via driving coils L1m, L2m. The inverting input terminals of the operational amplifiers OP9, OP10 are connected to ground through auxiliary coils L1s, L2s and variable resistors VR5, VR6. In the particular embodiment, auxiliary coils L1s, L2s are used to detect the speed of the rotors 32A, 32B. The auxiliary coils L1s, L2s generate voltages responsive to the angular velocities and angular positions of the rotor 32A, 32B, and these voltages are fed back to the operational amplifiers OP9, OP10. The amounts of the feedback voltages can be adjusted by the variable resistors VR5, VR6.

Capacitors C1, C2 are connected in parallel with resistors R23, R24 to prevent undesired oscillation.

By arranging the variable resistors VR5, VR6 to form, for example, a two-serial variable resistor and by varying its resistance, the rotational speed can be greatly changed without changing the starting torque. A simple test resulted in changing the rotational speed in the range of 30 r.p.m. to 3,000 r.p.m.

The operation of the circuit shown in FIG. 10 is explained below. When a continuous rotation is desired without external manipulation, all of the switches SW3, SW4, SW5, SW6 are connected to their a-contacts. Additionally, the switches SW1, SW2 are connected to their a-contacts for forward rotation, and connected to their b-contacts for reverse rotation.

Power source voltages supplied to the power source input terminals 60, 62 from a power source (not shown) are supplied as a plus power source and a minus power source to the operational amplifiers OP1 to OP10. The constant voltage diodes ZD1, ZD2 produce constant voltages from the power source voltages from the power source input terminals 60, 62, and supply the constant voltages to the Hall elements H1, H2. Additionally, by appropriately adjusting the potentiometers VR1, VR2, the offsets of the output voltages of the Hall elements H1, H2 are adjusted.

The Hall elements H1, H2 generate an output voltages representative of the rotational angular positions of the rotors 32A, 32B, respectively. The output voltages of the Hall elements H1, H2 are inversely amplified by the circuit including the operational amplifier OP1 and the resistor R5 and the circuit including OP2 and R6. The circuit including the operational amplifier OP3 and the resistors R7, VR3 and the circuit including OP4, R8 and VR4 adjust the amplitudes of the output voltages of the operational amplifiers OP1, OP2. By adjusting the resistances of the semi-fixed resistors VR3, VR4, the gains are adjusted. The outputs of the operational amplifiers OP3, OP4 become voltage signals resulting from amplifying the output voltages of the Hall elements H1, H2 to the desired amplitudes while maintaining their phases and waveforms.

Therefore, two signals each variable in sinusoidal waveform in response to the rotational angle $\theta$ and different in phase by 90 degrees from each other are obtained from the output terminals 66, 68. By using these two signals, i.e. their tangential or cotangential value, the absolute value of the rotational angle $\theta$ can be measured.

The circuit composed of OP5, R9, R11 and the circuit composed of OP6, R10, R12 reverse polarities of the operational amplifiers OP3, OP4 to invert the rotational angle.

More specifically, when both switches SW1, SW2 are connected to the a-contacts, the output voltages of the operational amplifiers OP3, OP4 in the same phase as the output voltages of the Hall elements H1, H2 are applied to the differential amplifier including the operational amplifier OP8 through the switches SW1 and SW6 and to the differential amplifier including the operational amplifier OP7 through the switches SW2 and SW5. When both switches SW1, SW2 are connected to the b-contacts, the output voltages of the operational amplifier OP5, OP6 different in phase by 180 degrees from the output voltages of the Hall elements H1, H2 are applied to the differential amplifier including the operational amplifier OP8 through the switches SW1 and SW6 and to the differential amplifier including the operational amplifier OP7 through the switches SW2 and SW5.

When a continuous rotation is desired like an ordinary motor, since the switches SW3, SW4 are at the a-contacts, the other inputs of the circuit composed of OP7, R13, R15, R17, R19 and the circuit composed of OP8, R14, R16, R18, R20 are supplied with ground potential. Therefore, the operational amplifiers OP7, OP8 output the (amplified) differences of the adjusted output voltages of the Hall elements H1, H2 from ground potential. That is, output waveforms of the operational amplifiers OP7, OP8 are substantially the same as those of the switches SW1, SW2.

The circuit including OP9, R21, R23 and the circuit including OP10, R22, R24 power-amplify the outputs from the operational amplifiers OP7, OP8, and supply the driving coils L1m and L2m with currents having the same waveforms and the same or opposite phases as or to those of the output voltages of the Hall elements H2, H1, respectively. As a result, as shown in FIG. 9(5), the output torques of the rotors 32A, 32B become squared waveforms of sinusoidal waves or cosine waves, and their composite torque exhibits a constant value.

The auxiliary coils L1s, L2s generate voltages responsive to angular velocities and angular positions of the rotors 32A, 32B, and these voltages are fed back to the operational amplifiers OP9, OP10 to control rotational speeds of the rotors 32A, 32B. The amount of feedback voltage is determined by the variable resistors VR5, VR6.

As can be appreciated, if changeover between forward rotation and reverse rotation is not desired, the circuit portions related to the operational amplifiers OP5, OP6 and the switches SW1, SW2 may be omitted. Similarly, when selection of external manipulation is not desired, the switches SW3, SW4, SW5, SW6 and the circuit portions related to the operational amplifiers OP7 and OP8 may be omitted. That is, it is sufficient to drive the driving coils L2m, L1m by outputs of the Hall elements H1, H2, which simplifies the circuit arrangement.

Figure 11:
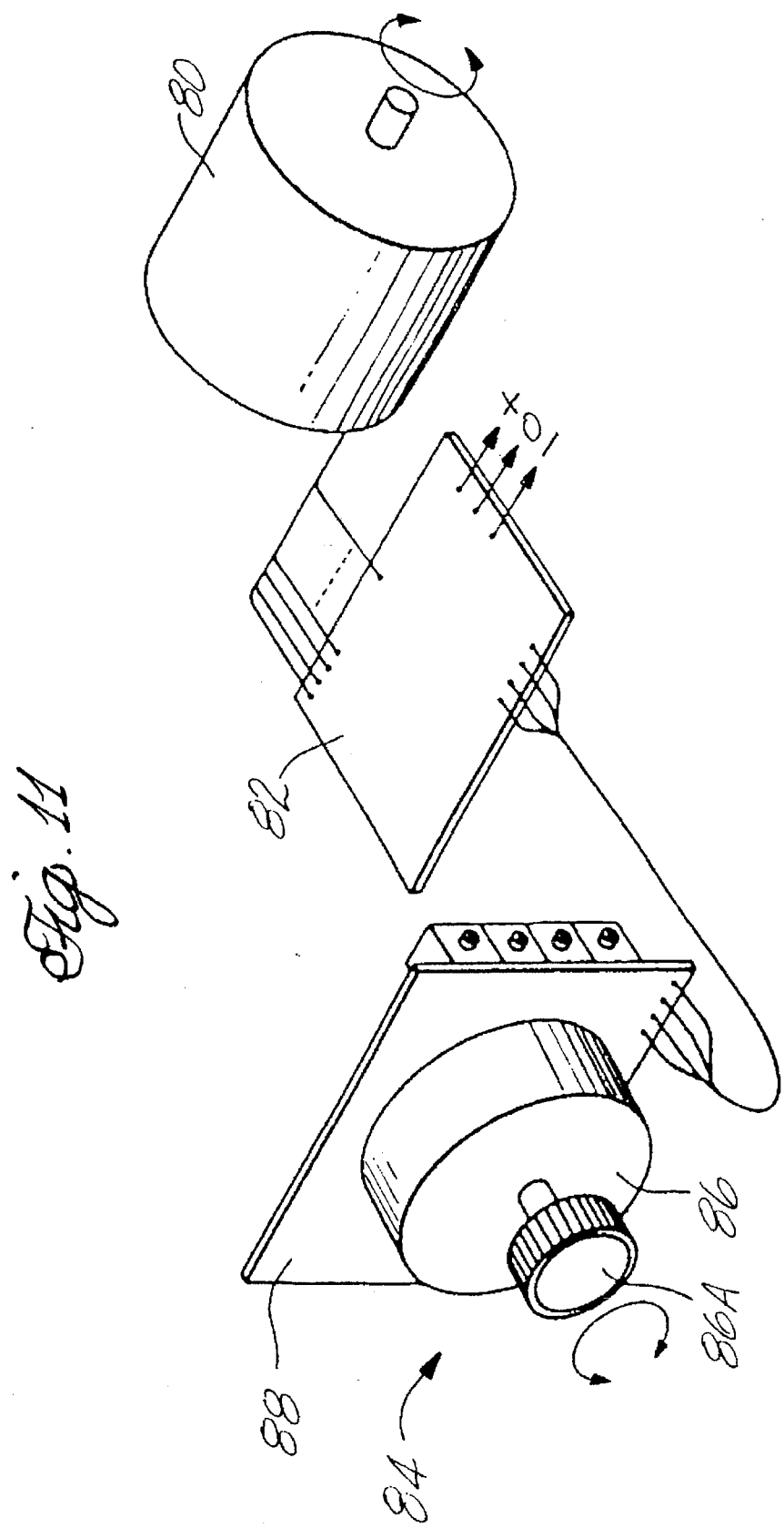
FIG. 11 is a perspective view of an arrangement for remote control.

Before explaining the operation of external manipulation with the circuit shown in FIG. 10, an explanation is given of an embodiment of a remote control device for generating a control voltage signal supplied to input terminals. FIG. 11 is a perspective view in which the embodiment of the remote control device is connected to the embodiment of the actuator shown in FIGS. 5 to 8. Numeral 80 refers to the actuator explained with reference to FIGS. 5 to 8, and 82 to a circuit board on which the circuit shown in FIG. 10 is mounted. Numeral 84 refers to the embodiment of the remote control device including a rotation manipulator 86 and a circuit board 88 on which a circuit for processing the operation signal from the rotation manipulator 86 is mounted. A cross-sectional view of the rotation manipulator 86 is shown in FIG. 12, and a circuit diagram of the circuit board 88 is shown in FIG. 13.

Figure 12:
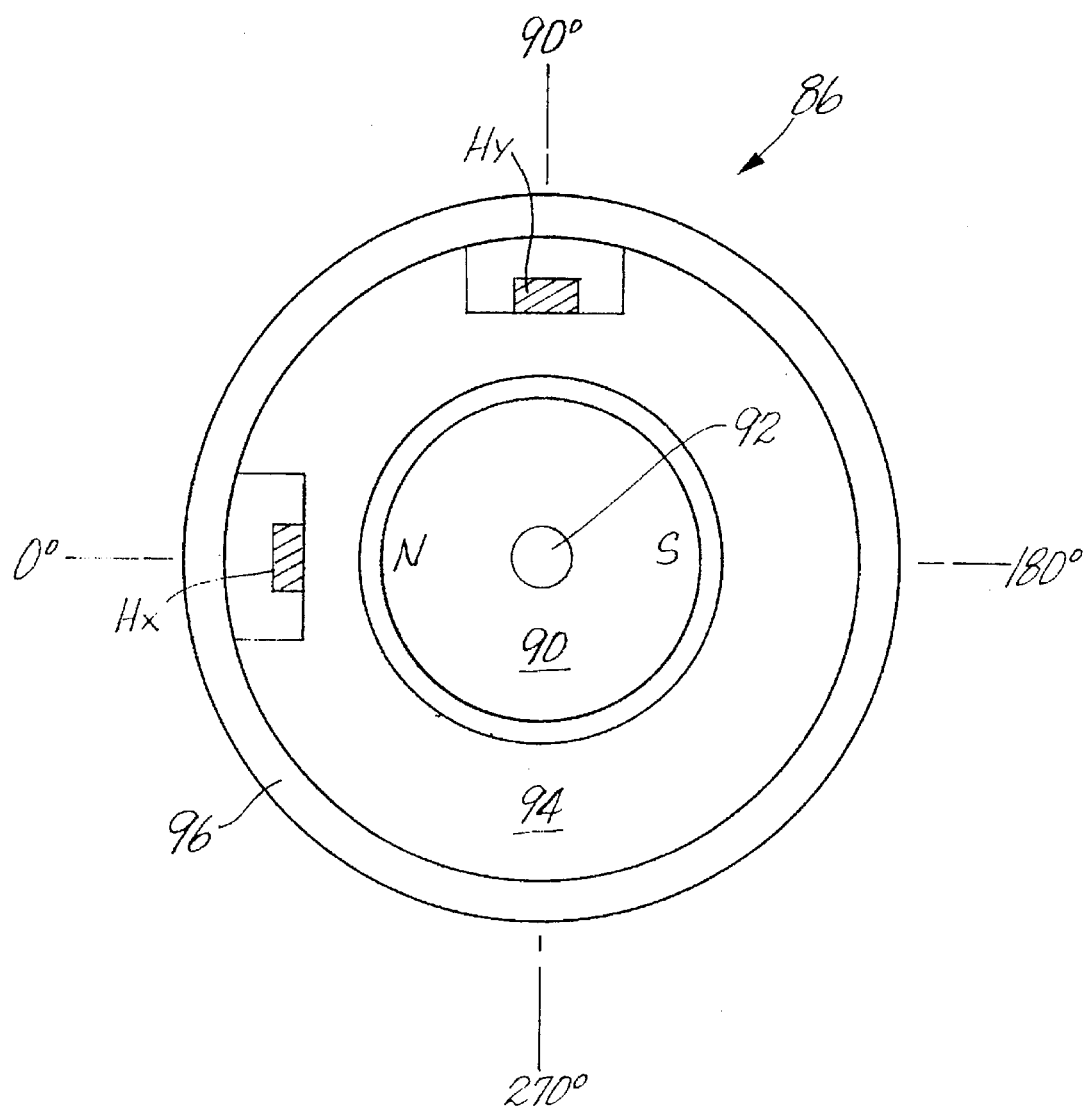
FIG. 12 is a cross-sectional view of a member 86 of a remote control device 84.
Figure 13:
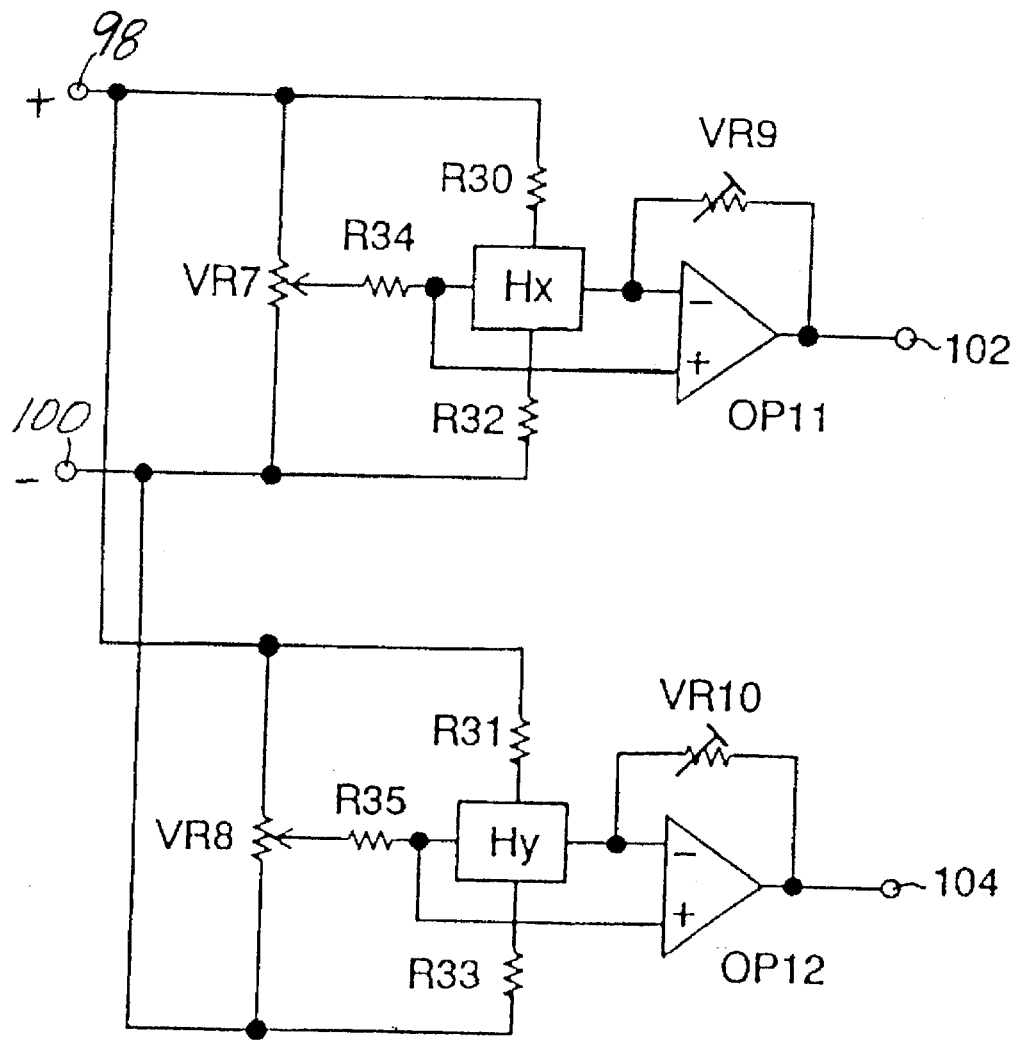
FIG. 13 is a circuit arrangement for processing an output from the rotation manipulator 86.

With reference to FIG. 12, the rotation manipulator 86 is explained. The rotation manipulator 86 essentially has the same construction as the motors 30A, 30B without a driving coil and an auxiliary coil That is, a disk-shaped rotor 90 magnetized in one direction is fixedly mounted on a rotating shaft 92. The rotor 90 lies in a hollow cylindrical member 94 spaced a predetermined distance from the inner surface of the cylindrical member 94. The cylindrical member 94 is made of a similar material as that of the bobbins 36A, 36B. As with motors 30A, 30B, manipulator 86 has Hall elements Hx, Hy fixed at positions on intersecting radial lines of the cylindrical member 94. A yoke 96 is disposed outside the cylindrical member 9. The rotating shaft 92 can be rotated by manipulation of a rotation manipulating knob 86a (FIG. 11).

The circuit on the circuit board 88 is explained below with reference to FIG. 13. This is the same circuit shown in FIG. 10 which is essentially the same as the circuit for offset-adjusting and amplitude-adjusting the outputs of the Hall element H1, H2. That is, applied from a power source circuit (not shown) are a plus power source voltage to a power source terminal 98 and a minus power source voltage to a power source terminal 100. The Hall elements Hx, Hy are supplied with constant currents through resistors R30, R32 and through resistors R31, R33, respectively. One of two magnetic detection outputs is connected to the inverting input terminals of operational amplifiers OP11, OP12, and the other is connected to the non-inverting input terminals of the operational amplifiers OP11, OP12 and to resistors R34, R35.

The other ends of the resistors R34, R35 are connected to the sliders of potentiometers VR7, VR8. The potentiometers VR7, VR8 are supplied with power source voltages and cooperate with the resistors R34, R35 to determine offsets of magnetic detection output voltages of the Hall elements Hx, Hy.

The outputs of the operational amplifiers OP11, OP12 are fed back to their inverting input terminals through semi-fixed resistors VR9, VR10. The outputs of the operational amplifiers OP11, OP12 are externally available at output terminals 102, 104, which are connected to the input terminals 70, 72 in FIG. 10.

Figure 14:
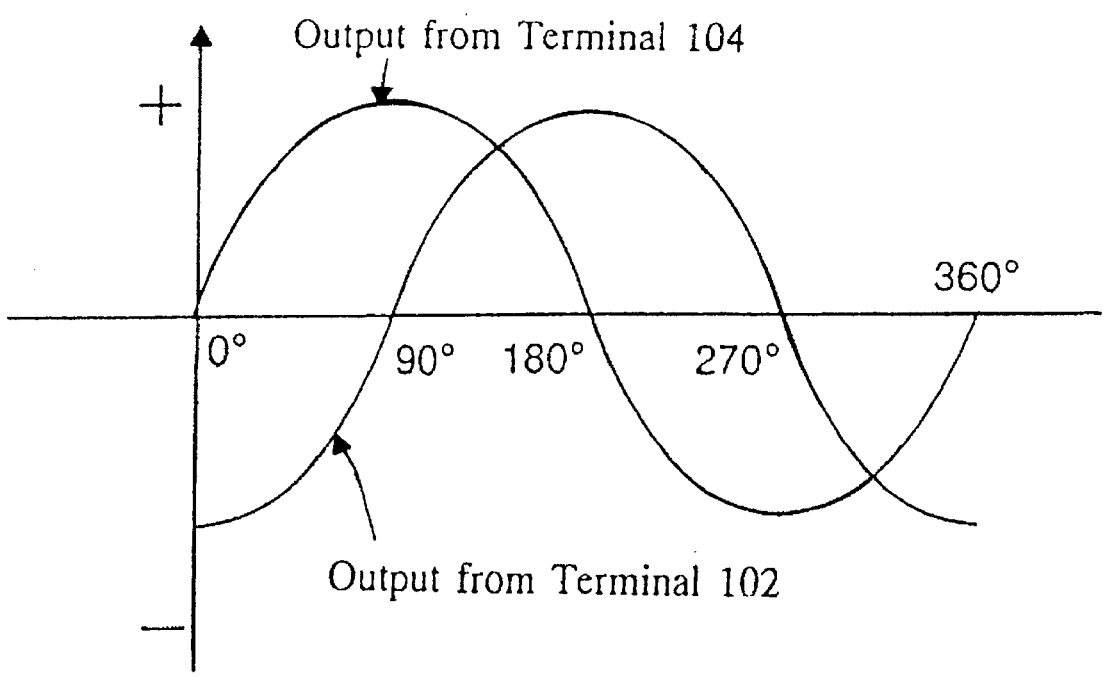
FIG. 14 shows waveforms of outputs from output terminals 102 and 104 of the circuit shown in FIG. 13.

By adjusting the potentiometers VR7, VR8 and the semi-fixed resistors VR9, VR10, the output voltages at the output terminals 102, 104 are adjusted to exhibit the same levels as the output voltages at the output terminals 68, 66 of FIG. 10. As a result, the output terminals 102, 104 output voltage signals of sinusoidal waveforms in the same phase and amplitude as the signals at the output terminals 68, 66 of FIG. 10. The output waveforms of the output terminals 102, 104 are shown in FIG. 14.

When the remote control device 84 is used, all of the switches SW3, SW4, SW5, SW6 are connected to the b-contacts. Then the operational amplifier OP7 outputs the difference between the inverted and adjusted output voltage of the Hall element H1 of the motor 30A and the control signal at the input terminal 70 from the remote control device 84, causing a current proportional to the difference to flow through the driving coil L1m. Similarly, the operational amplifier OP8 outputs the difference between the inverted and adjusted output voltage of the Hall element H2 of the motor 30B and the control signal of the input terminal 72 from the remote control device 84, causing a current proportional to the difference to flow though the driving coil L2m. As a result, the rotors 32A, 32B rotate to and stop at the positions where the (positive or opposite) adjusted output voltages of the Hall elements H1, H2 coincide with the control signals from the remote control device 84. That is, the actuator 80 rotates in response to manually-driven rotation of the remote control device 84 through which not only the rotational speed of the actuator 80 but also the rotational angle can be remote-controlled with accuracy.

The remote control device 84 has been illustrated as mechanically creating two sinusoidal waves different in phase by 90 degrees. However, it may be modified to create similar sinusoidal waves by digital operational means such as a microprocessor which would ensure even more accurate control of the rotational angle and speed.

Although FIGS. 5 to 8 show the two motors 30A, 30B in axial (end-to-end) connection, they may be connected in parallel (side-by-side relation). An embodiment using such parallel connection of motors is explained below with reference to FIG. 15, which is a plan view of the embodiment, FIG. 16, which is a cross-sectional view taken along the C—C line of FIG. 15, and FIG. 17, which is an exploded perspective view of the embodiment.

Numerals 110A, 110B denote brushless motors having the same constructions as those of the motors 30A, 30B and fixed between two mounting plates 112, 114. Rotating shafts 116A, 116B of the motors 110A, 110B rotatably extend through holes in the mounting plates 112, 114. Instead of being inline as the embodiment of FIG. 5, the respective motors and their shafts are side by side. Mounted on the rotating shafts 116A, 116B are coupling gears 118A, 118B having the same number of teeth. The coupling gears 118A, 118B mesh with a connection gear 120. The connection gear 120 has a rotating shaft 122 rotatably supported by a bearing 124 of the mounting plate 114. The rotating shaft 122 behaves as the output shaft in this embodiment.

Disposed between the mounting plates 112,114 at four corners thereof are cylindrical spacers having a predetermined length and receiving screws 128 therein to fix the mounting plates 112, 114 with a predetermined distance therebetween.

The interior construction of the motors 110A, 110B is explained below with reference to FIG. 16. Individually, the motor 110A has the same cross-sectional structure as that of the motor 30A (see FIG. 7), and the motor 110B has the same cross-sectional structure as that of the motor 30B (see FIG. 8).

Rotors 132A, 132B of the motors 110A, 110B are disk-shaped or cylindrical, and each have one S pole and one N pole along the circumference. Disposed outside the rotors 132A, 132B are bobbins 136A and 136B spaced a uniform distance from the rotors. Each of the bobbins 136A, 136B consists of two divisional halves, namely, 136A-1 and 136A-2 for the bobbin 136A, and 136B-1 and 136B-2 for the bobbin 136B.

The bobbin 136A of the motor 110A supports parallel windings of a field-producing driving coil 138A and an auxiliary coil 140A for assisting, controlling or braking the driving torque. Similarly, the bobbin 136B of the motor 110B supports a parallel windings of a field-producing driving coil 138B and an auxiliary coil 140B for assisting, controlling or braking the driving torque.

Numerals 142A, 142B refer to Hall elements for detecting the rotational phase relation of the rotors 132A, 132B. Hall elements 142A, 142B are disposed such that their sensitive directions coincide with the exciting directions of the driving coils 138A, 138B, respectively. As a result, when individually observing the motors 110A and 110B, the Hall elements 142A and 142B respectively output a sinusoidal voltage different in phase by 90 degrees from the output torque of the associated motor 110A or 110B. Provided on the outer surfaces of the bobbins 136A, 136B are recesses for accommodating the Hall elements 142A, 142B, respectively. The above-described assemblies are accommodated in cylindrical yokes 146A, 146B for protection from the exterior.

In this embodiment, the magnetic direction of the rotor 132A coincides with the magnetic direction of the rotor 132B, and the gears 118A, 118B engage the connection gear 120 such that the exciting directions of the driving coils 138A, 138B intersect with each other. That is, the motors 110A, 110B are linked by the connection gear 120 to put the rotors 132A, 132B and the driving coils 138A, 138B in the positional relationship shown in FIG. 16.

Figure 15:
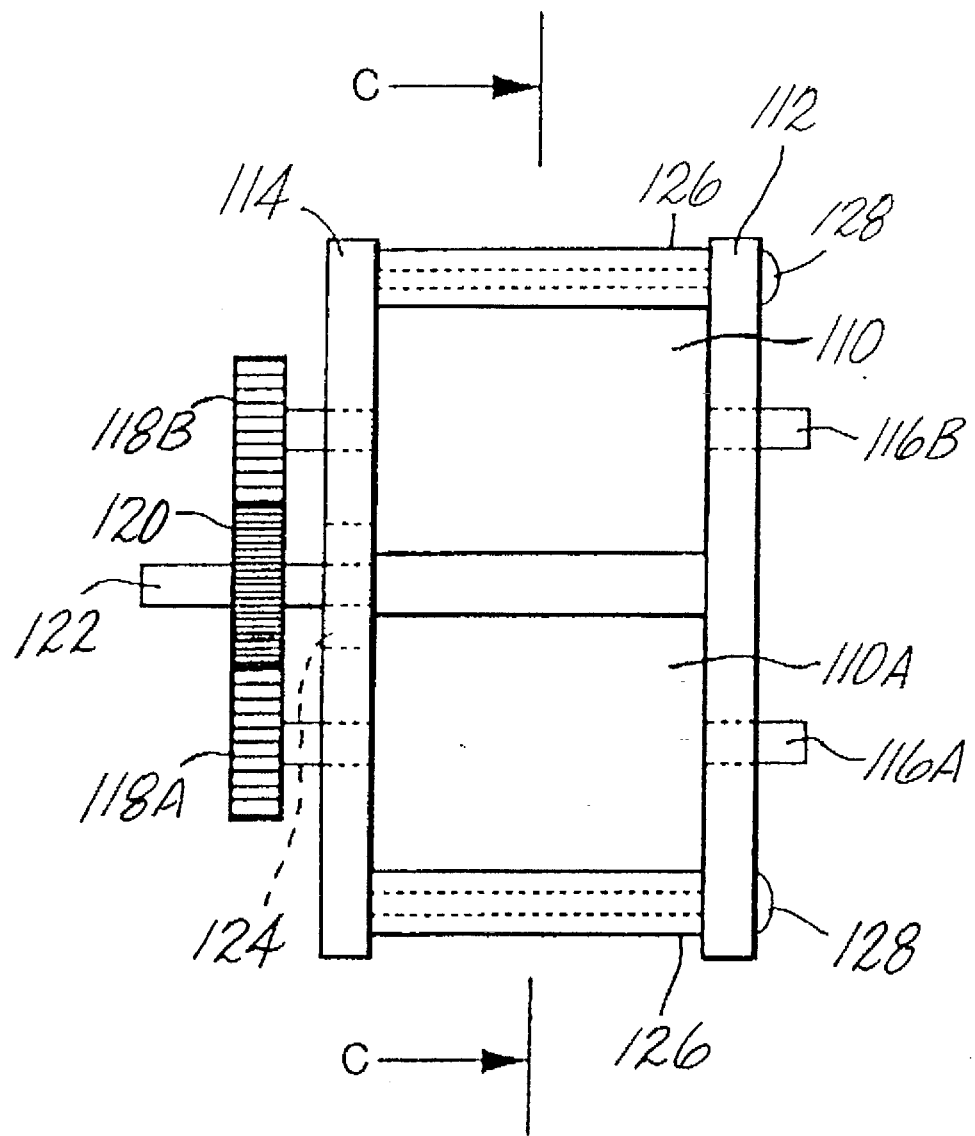
FIG. 15 is a plan view of a parallel-coupled type actuator taken as a further embodiment of the invention in which two motors are coupled in a side-by-side relationship.
Figure 16:
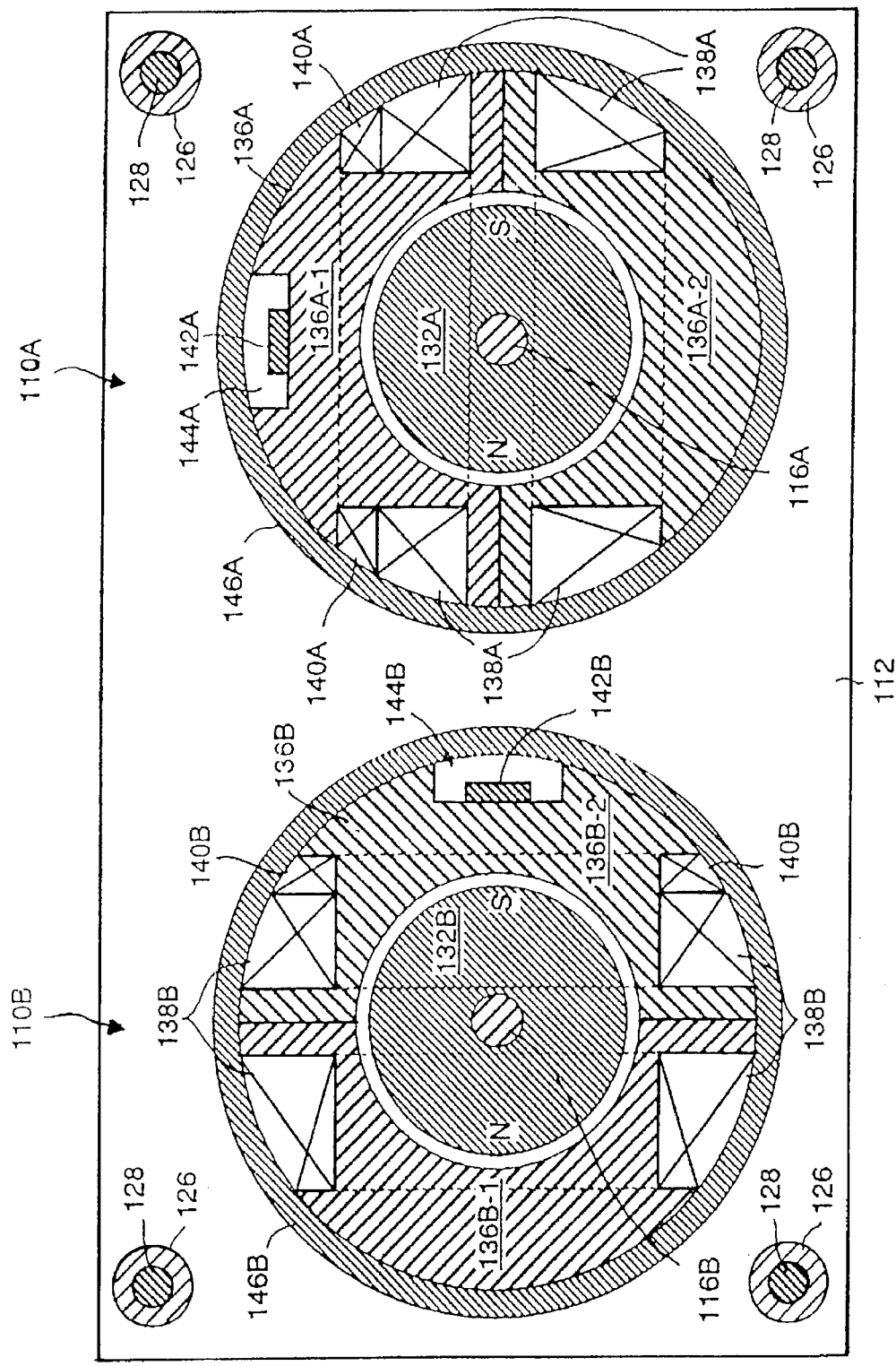
FIG. 16 is a cross-sectional view of the actuator taken along the C—C line of FIG. 15.

The parallel-coupled actuator shown in FIGS. 15 to 17 has the same behavior as that of the axially coupled actuator shown in FIGS. 5 to 8. That is, an output torque with no ripple can be realized in an ideal condition. Also the driving circuit shown in FIG. 10 may be used in the same manner. L1m in FIG. 10 may be regarded as the driving coil 138A, L1s as the auxiliary coil 140A, L2m as the driving coil 138B, L2s as the auxiliary coil 140B, H1 as the Hall element 142A, and H2 as the Hall element 12B, respectively. Therefore, this embodiment permits remote control of the rotational angular position and the rotational speed through the remote control device 84.

The magnetic directions of the rotors and the positional relations of the driving coils relative to the Hall elements between the motors 30A (or 110A) and 30B (or 110B) are not limited to the embodiments illustrated. It is essentially sufficient to arrange one of the motors to bring its driving coil and rotor to positions for producing a maximum torque, to arrange the other motor to bring its driving coil and rotor to positions for producing no torque, and to couple the output shafts of these motors.

FIG. 18 shows another example of magnetic directions of rotors and positional relations between driving coils and Hall elements in case of coupling two motors in series or in parallel. FIG. 18 is a cross-sectional view similar to those of FIGS. 7, 8 and 16. In FIG. 18, La refers to a driving coil (and an auxiliary coil) of a motor A, Lb to a driving coil (and an auxiliary coil) of a motor B, Ha to a Hall element of the motor A, Hb to a Hall element of the motor B, Ra to a rotor of the motor A, and Rb to a rotor of the motor B.

As illustrated, the Hall elements Ha, Hb are located at positions perpendicular to the winding planes of the driving coils La, Lb. That is, the Hall Elements Ha, Hb are located on the center line of the coil axes and are oriented to detect rotation of the rotors Ra, Rb. The magnetic directions of the rotors Ra, Rb, however, may be changed because any direction may be accommodated by changing the winding direction of the driving coils La, Lb or the direction of the driving currents. The Hall elements Ha, Hb may of course be located at rotationally symmetrical positions.

FIG. 18(1) shows an example in which the magnetic directions of the rotors Ra, Rb are parallel like the embodiments referred to above, and a phase difference of 90 degrees is made between the output torques of the motors A, B by orienting the driving coils La, Lb to intersect with each other.

FIG. 18(2) shows an example in which magnetic directions of the rotors Ra, Rb intersect, and a phase difference of 90 degrees is made between output torques of the motors A, B by orienting the driving coils La, Lb in parallel.

FIG. 18(3) shows an example slightly different from the above two examples, in which the magnetic direction of the rotor Ra coincides with the exciting direction of the driving coil La in the motor A while the magnetic direction of the rotor Rb coincides with the exciting direction of the driving coil Lb in the motor B. As a result, a phase difference of 90 degrees is produced between the output torques of the motors A, B. The drawing shows the magnetic direction of the rotor Ra as being inclined at 45 degrees to the magnetic direction of the rotor Rb; however, this angle itself is neither critical nor important.

The above embodiment illustrates two physically separate motors; however, these motors may be incorporated into an integral structure to reduce the size of the apparatus. An embodiment particularly directed to this purpose is explained below with reference to FIG. 19, which is a horizontal cross-sectional view taken along a plane perpendicular to a rotating shaft, FIG. 20, which is a back elevation, FIG. 21, which is a central vertical cross-sectional view taken along the line D—D of FIG. 19, and FIG. 22, which is a central vertical cross-sectional view taken along the line E—E of FIG. 19.

Fixed on a rotating shaft 210 is a disk-shaped or cylindrical rotor 212 having one S pole and one N pole along its circumference. As shown in FIG. 19, located outside the rotor 212 are a bobbin 218A on which a driving coil 214A and an auxiliary coil 216A are wound within the 0°–180° plane and a bobbin 218B on which a driving coil 214B and an auxiliary coil 216B are wound within the 90°–270° plane.

The assembly of the driving coils 214A, 214B, auxiliary coils 216A, 216B and bobbins 218A, 218B is disposed in a cylindrical yoke 220. Also disposed in the yoke 220 are Hall elements 222A, 222B at the 90° position and the 180° position in FIG. 19. The Hall element 222A is positioned such that its sensitive direction coincides with the exciting direction of the driving coil 214A, and the Hall element 222B is positioned such that its sensitive direction coincides with the exciting direction of the driving coil 214B. That is, the Hall elements 222A, 222B are located at positions where they produce sinusoidal waves different in phase by 90 degrees from the output torques produced by the coils 214A, 216A and the coils 214B, 214B.

In the illustrated positions, the coils 214B, 216B generate a magnetic field which does not pass through the Hall element 222A, and the coils 214A, 216A generate a magnetic field which does not pass through the Hall element 222B. As explained before, the Hall elements 222A, 222B, when located at such positions, are most distant from the coils 214A, 216A and from the coils 214B, 216B, and the magnetic fields generated by the coils 214A, 216A and by the coils 214B, 216B are so much weaker at the positions of the Hall elements 222A, 222B than the magnetic field generated by the rotor 212 that they can be substantially neglected. The bobbins 218A, 218B have recesses 224A, 224B on the outer circumferences thereof to accommodate the Hall elements 222B, 222A, respectively.

The yoke 220 has one end closed by an end plate 226 having the same dimension as that of the end surface thereof and the other end closed by a larger end plate 228. The end plate 226 holds a bearing 230 for supporting the rotating shaft 210, and the end plate 228 holds a bearing 232 for supporting the rotating shaft 210.

Each of the Hall elements 222A, 222B is fixed at one end of an L-shaped support plate 234A (or 234B). The end plate 228 has cutouts along its outer circumference to receive the support plates 234A, 234B. The other end of the support plate 234A is secured on the bobbin 218B by a rivet applied through the end plate 228. The other end of the support plate 234B is secured on the bobbin 218A by a rivet 236B applied through the end plate 228. Bores provided in the support plates 234A, 234B to receive the rivets 234A, 236B are elongated in transversal directions to permit fine adjustment of the circumferential angular position of the Hall elements 222A, 222B. The rivets 236A, 236B also serve to fix the bobbins 218B, 218A to the end plate 228.

The bobbin 218A is also fixed to the end plate 228 by a rivet 238 at the opposite side of the rivet 236B with respect to the rotating shaft 210. Similarly, the bobbin 218B is fixed to the end plate 228 by a rivet 240 at the opposite side of the rivet 236A with respect to the rotating shaft 210. A bore provided in the end plate 228 to receive the rivet 240 is elongated to permit fine adjustment of the mounting position of the bobbin 218B, i.e. the coils 214B, 216B.

Positional adjustment of the driving coil 214B (and the auxiliary coil 216B) may be done by externally rotating the rotating shaft 210 at a constant speed while drawing a Lissajous figure on an oscilloscope with an output voltage of the driving coil 214A and an output voltage of the driving coil 214B, then produced, and by fixing the bobbin 218B at a position where the figure exhibits a regular circle. This establishes a 90 degree phase relationship between the sinusoidal output torques produced by coils 214A, 216A and coils 214B, 214B.

Also regarding the Hall elements 222A, 222B, similarly to the coils 214A, 216A and the coils 214B, 216B, while externally rotating the rotating shaft 210 at a constant speed, the Hall element 222A may be positioned such that its output voltage is different in phase by 90 degrees from the output voltage of the driving coil 214A, and the Hall element 222B may be positioned such that its output voltage is different in phase by 90 degrees from the output voltage of the driving coil 214B.

Also the embodiment shown in FIGS. 19 to 22 performs in the same manner as the embodiment shown in FIGS. 5 to 8 in that it first adjusts offsets and amplitudes of the outputs of the Hall elements 222A, 222B, next amplifies the power of these outputs, and then applies them to the driving coils 214A, 214B, such that sinusoidal currents in the desired phases flow in the driving coils 214A, 214B. That is, the same operation and effects as those explained with reference to FIG. 9 are obtained, and an output torque with no ripple is obtained under ideal conditions.

The driving circuit shown in FIG. 10 may also be applied to the embodiment of the actuator shown in FIGS. 19 to 22 without modifying the driving circuit by treating L1m in FIG. 10 as the driving coil 214A, L1s as the auxiliary coil 216A, L2m as the driving coil 214B, L2s as the auxiliary coil 216B, H1 as the Hall element 222A, and H2 as the Hall element 222B, respectively. Therefore, the remote control device shown in FIGS. 11 to 13 may also be applied to the embodiment of the actuator shown in FIGS. 19 to 22 without modifying the remote control device.

Figure 21:
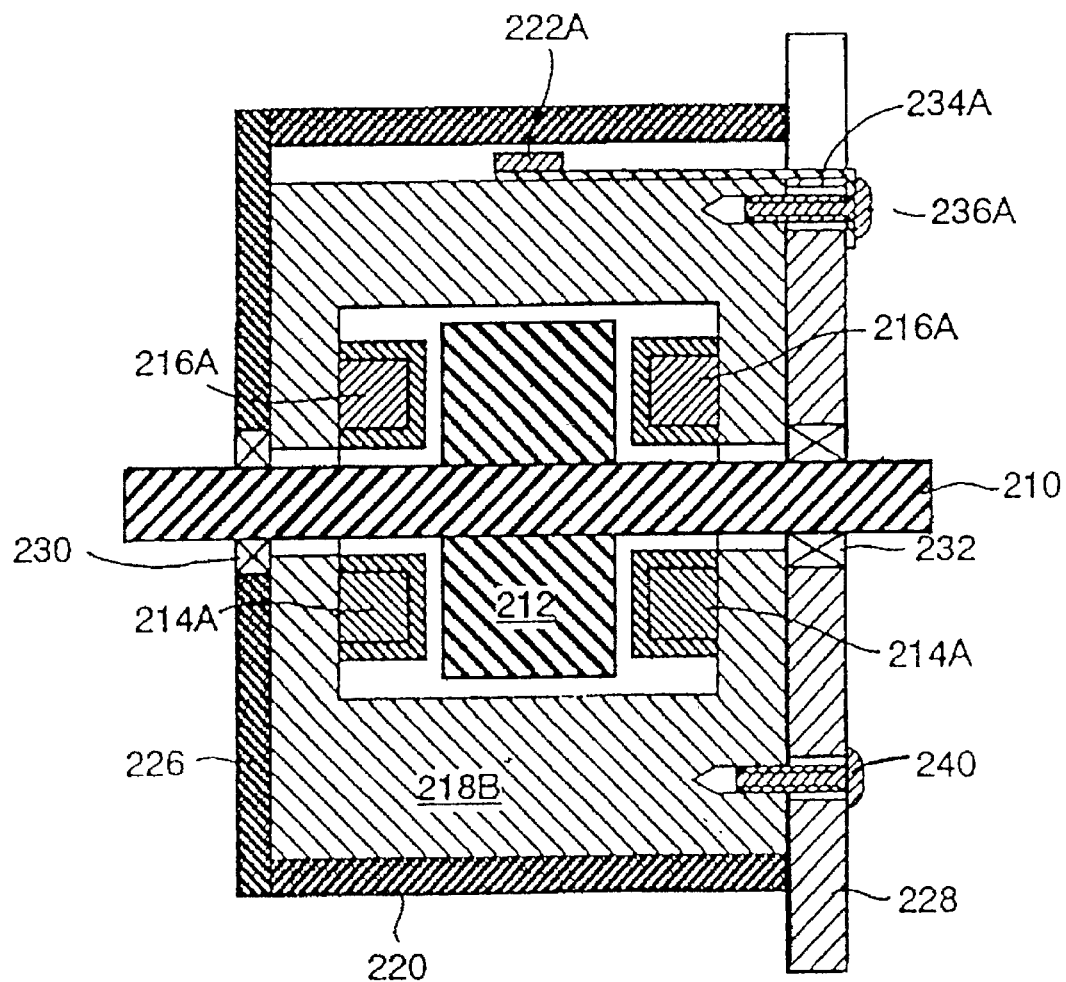
FIG. 21 is a central longitudinal cross-sectional view taken along the D—D line of FIG. 19.
Figure 22:
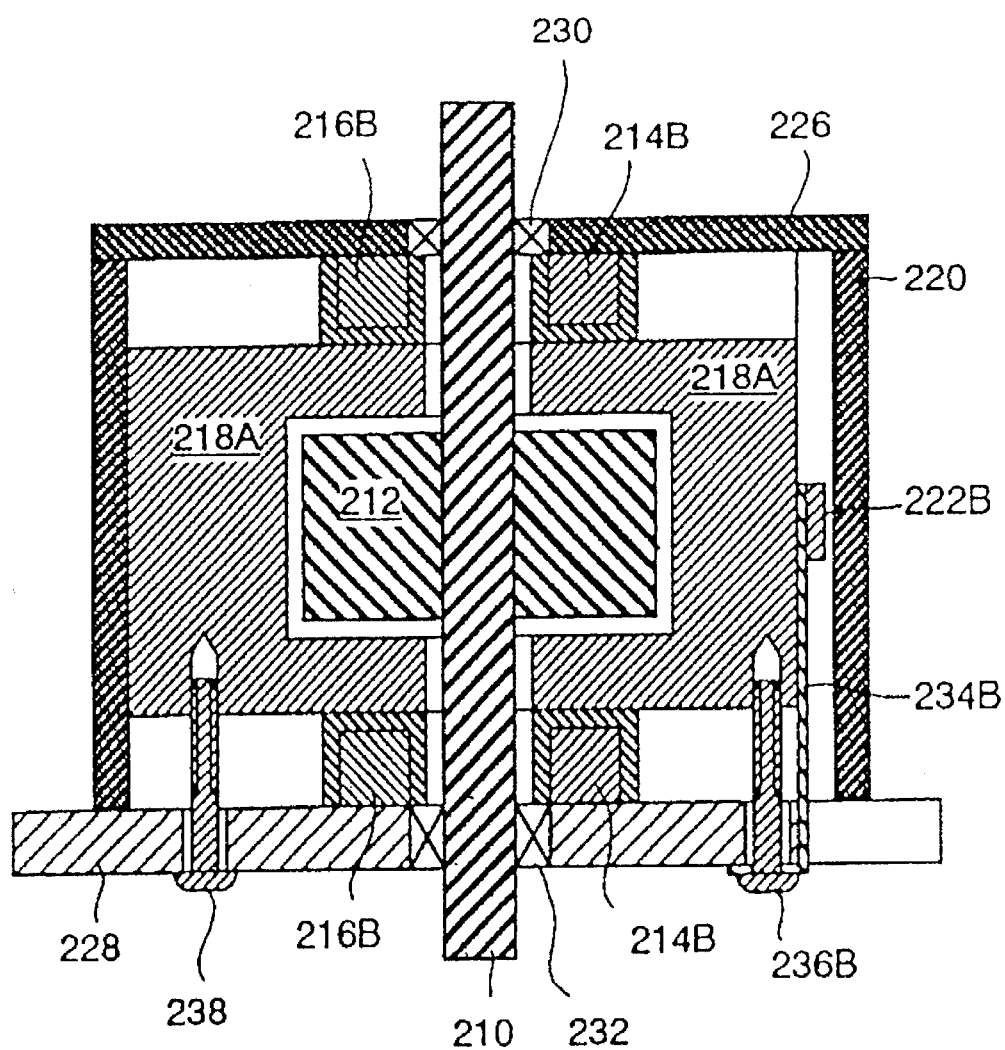
FIG. 22 is a central longitudinal cross-sectional view taken along the E—E line of FIG. 19.
Figure 23:
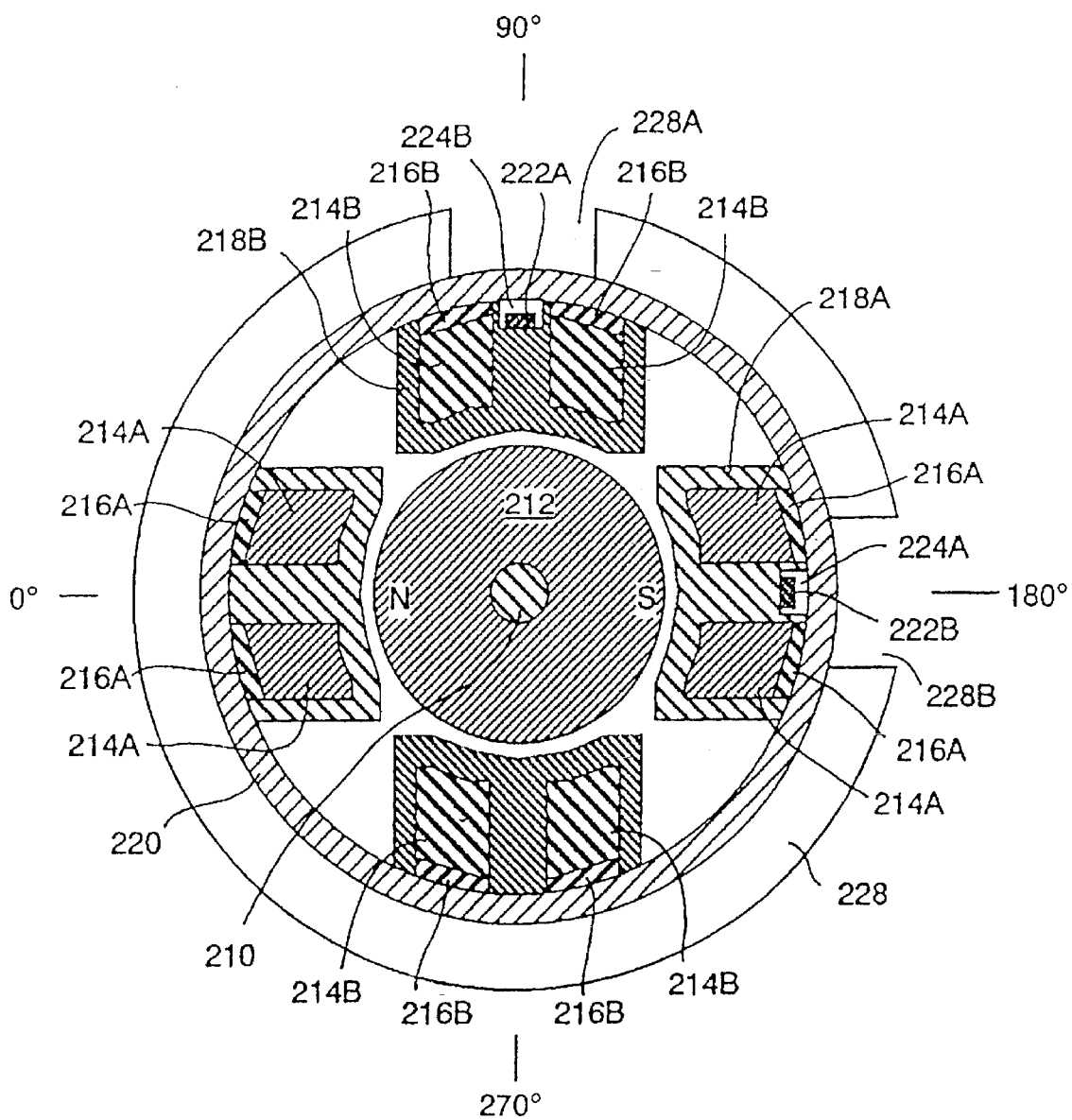
FIG. 23 is a cross sectional view of a modified arrangement of FIG. 19 in which auxiliary coils 216A and 216B are located outside driving coils 214A and 214B.

In the respective embodiments described above, the auxiliary coils 40A, 40B are disposed in a parallel side-by-side relation with the driving coils 38A, 38B (auxiliary coils 140A, 140B with driving coils 138A, 138B, and auxiliary coils 216A, 216B with driving coils 214A, 214B); however, they may be disposed on the outer or inner circumferential surface, or as intermediate layers of the driving coils 38A, 38B (driving coils 138A, 138B and driving coils 214A, 214). FIG. 23 is a cross-sectional view of an example modified from the embodiment of FIG. 19 by winding the auxiliary coils 216A, 216B on outer circumferential surfaces of the driving coils 214A, 214B. FIGS. 19, 21 and 22 show the auxiliary coils as if having the same cross-sectional areas as those of the driving coils; however, this is only for convenience of illustration. Actually, as can be appreciated by those skilled in the art, an appropriate cross-sectional area corresponding to a desired number of windings would be assigned to each of the auxiliary coils.

The embodiments have been described as using Hall elements to obtain sinusoidal waveforms responsive to the rotational angle of the rotating shaft; however, sinusoidal waveforms may be produced on the basis of information on absolute angles of rotations obtained by rotary encoders, such as absolute-type or pseudo-absolute-type rotary encoders. The use of Hall elements, of course, contributes to more simplification of the circuit and more physical miniaturization of the mechanical structure.

The description and the drawings herein show an analog circuit as the driving circuit; however, the driving circuit may of course be replaced by a digital circuit. In particular, when using rotary encoders in lieu of Hall elements, the use of a digital driving circuit is more advantageous.

By using the analog circuit shown in FIG. 10, currents flowing in the motor and in the circuit would logically exhibit sinusoidal waveforms responsive to the rotational angle of the motor, and also actually exhibits substantially ideal waveforms. Since high frequency components typically liable to cause wave disturbances are not contained, various restrictions by laws and regulations on electric waves can be readily overcome.

Although the invention has been shown and described with respect to preferred embodiments thereof, it should be understood by those skilled in the art that the foregoing and other changes and omission in the form and detail thereof may be made therein without departing from the spirit and scope of the invention, which is to be limited and defined only as set forth in the following claims.

The disclosures of the priority Japanese applications, Nos. 169958/1993 filed Jul. 9, 1993 and 311,860/1993 filed Dec. 13, 1993, are incorporated fully herein by reference.

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. An actuating apparatus having an actuator including a rotor fixed on a rotating shaft and having magnetic poles at predetermined radial positions, a first driving coil and a second driving coil disposed to intersect with each other, a ferroelectric yoke encircling said rotor and said first and second driving coils, first rotation detecting means located between said rotor and said yoke and at a center of said second driving coil for detecting the rotating position of said rotor and outputting a sinusoidal wave signal different in phase substantially by 90 degrees from an output torque produced by said first driving coil, and second rotation detecting means located between said rotor and said yoke and at the center of said first driving coil for detecting the rotating position of said rotor and outputting a sinusoidal wave signal different in phase substantially by 90 degrees from an output torque produced by said second driving coil; and a driving circuit for driving said actuator in response to first and second external inputs, said driving circuit comprising:

first differential amplifying means for outputting a difference between an output of said first rotation detecting means and said first external input;

first power amplifying means for power-amplifying an output of said first differential amplifying means and applying it to said first driving coil;

second differential amplifying means for outputting a difference between an output of said second rotation detecting means and said second external input; and second power amplifying means for power-amplifying an output of said second differential amplifying means and applying it to said second driving coil.

2. The actuating apparatus of claim 1 wherein said first and second external inputs are sinusoidal waves different in phase substantially by 90 degrees.

* * * * *

UNITED STATES PATENT AND TRADEMARK OFFICE
CERTIFICATE OF CORRECTION

PATENT NO. : 5,646,466
DATED : July 8, 1997
INVENTOR(S) : Takayoshi Noji; Sadayoshi Narusawa It is certified that error appears in the above-indentified patent and that said Letters Patent is hereby corrected as shown below:

On the title page:
Abstract, lines 5,6, replace "as the combine" with -- as to combine --.
Column 2, line 3, replace "a first and a second" with -- first and second --.
Column 2, line 53, replace "a first and a second" with -- first and second --.
Column 4, line 57, replace "circuits 2A, 24B" with -- circuits 24A,24B --.
Column 4, line 61, between "motor" and "are" insert -- 20A --.
Column 6, line 67, replace "elements 42A,2B" with -- elements 42A,42B --.
Column 7, line 40, change "Numeral" to -- Numerals --.
Column 8, line 6, replace "resistors R7,RS" with -- resistors R7,R8 --.
Column 9, line 59, after "generate" delete "an".
Column 11, line 19, after "coil" insert a period.
Column 11, line 28, replace "member 9" with -- member 94 --.
Column 13, line 3, after "supports" delete "a".
Column 13, line 36, replace "element 12B" with -- element 142B --.
Column 14, line 51, replace "coils 214B, 214B" with -- coils 214B, 216B --.
Column 15, line 35, replace "coils 214B, 214B" with -- coils 214B, 216B --.
Column 16, line 5, replace "coils 214A, 214)" with -- coils 214A, 214B) --.
Column 16, lines 55-67 and column 17, lines 1-6, should be deleted
and replaced with the following:

-- 1. An actuating apparatus having an actuator including a rotor fixed on a rotating shaft and having magnetic poles at predetermined radial positions, a first driving coil, a second driving coil angularly displaced from said first driving coil by substantially 90 degrees, a yoke encircling said rotor and said first and second driving coils, first rotation detecting means located between said rotor and said yoke along a central axis

UNITED STATES PATENT AND TRADEMARK OFFICE
CERTIFICATE OF CORRECTION

PATENT NO. : 5,646,466
DATED : July 8, 1997
INVENTOR(S) : Takayoshi Noji; Sadayoshi Narusawa It is certified that error appears in the above-indentified patent and that said Letters Patent is hereby corrected as shown below:

of said second driving coil for detecting the rotating position of said rotor and outputting a sinusoidal wave signal different in phase substantially by 90 degrees from an output torque produced by said second driving coil, and second rotation detecting means located between said rotor and said yoke along a central axis of said first driving coil for detecting the rotating position of said rotor and outputting a sinusoidal wave signal different in phase substantially by 90 degrees from an output torque produced by said first driving coil; and a driving circuit for driving said actuator in response to first and second external inputs, said driving circuit comprising: --.

Signed and Sealed this

Twenty-eighth Day of July, 1998

Attest:

BRUCE LEHMAN

*Attesting Officer*  *Commissioner of Patents and Trademarks*